US012573212B2

(12) United States Patent
Imai

(10) Patent No.: US 12,573,212 B2
(45) Date of Patent: Mar. 10, 2026

(54) INFORMATION PROCESSING DEVICE, INFORMATION PROCESSING METHOD, AND PROGRAM

(71) Applicant: Sony Semiconductor Solutions Corporation, Kanagawa (JP)

(72) Inventor: Hideaki Imai, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 89 days.

(21) Appl. No.: 18/267,436

(22) PCT Filed: Dec. 7, 2021

(86) PCT No.: PCT/JP2021/044817
§ 371 (c)(1),
(2) Date: Jun. 14, 2023

(87) PCT Pub. No.: WO2022/138123
PCT Pub. Date: Jun. 30, 2022

(65) Prior Publication Data
US 2024/0054793 A1     Feb. 15, 2024

Related U.S. Application Data

(60) Provisional application No. 63/128,297, filed on Dec. 21, 2020.

(30) Foreign Application Priority Data

Mar. 5, 2021     (JP) ................................. 2021-035452

(51) Int. Cl.
*G06V 20/56*          (2022.01)
*G06T 7/12*           (2017.01)
(Continued)

(52) U.S. Cl.
CPC .............. *G06V 20/588* (2022.01); *G06T 7/12* (2017.01); *G06T 7/50* (2017.01); *G06V 10/44* (2022.01);
(Continued)

(58) Field of Classification Search
None
See application file for complete search history.

(56) References Cited

U.S. PATENT DOCUMENTS

| | | | |
|---|---|---|---|
| 10,106,153 B1 | 10/2018 | Xiao | |
| 2019/0043203 A1* | 2/2019 | Fleishman | .............. G06F 18/29 |

(Continued)

FOREIGN PATENT DOCUMENTS

| | | |
|---|---|---|
| CN | 110389348 A | 10/2019 |
| CN | 111016887 A | 4/2020 |

(Continued)

OTHER PUBLICATIONS

International Search Report and Written Opinion mailed Mar. 5, 2022 in connection with International Application No. PCT/JP2021/044817.

(Continued)

*Primary Examiner* — Xiaolan Xu

(74) *Attorney, Agent, or Firm* — Wolf, Greenfield & Sacks, P.C.

(57)     ABSTRACT

To implement quick and smooth parking assistance close to a human sense without being affected by an environment of a parking space. A 3D semantic segmentation image having a plurality of pixel units, each pixel unit of the plurality of pixel units including the depth data and class information, are generated, an available parking space is searched for on the basis of the 3D semantic segmentation image, and a path
(Continued)

to the searched parking space is planned and a vehicle is controlled. The present disclosure can be applied to a parking assistance system.

18 Claims, 15 Drawing Sheets

(51) Int. Cl.
| | |
|---|---|
| *G06T 7/50* | (2017.01) |
| *G06V 10/44* | (2022.01) |
| *G06V 10/764* | (2022.01) |

(52) U.S. Cl.
CPC .. *G06V 10/764* (2022.01); *G06T 2207/20084* (2013.01); *G06T 2207/30264* (2013.01)

(56) References Cited

U.S. PATENT DOCUMENTS

| | | | |
|---|---|---|---|
| 2019/0291720 A1 | 9/2019 | Xiao | |
| 2020/0250485 A1* | 8/2020 | Nagori | G05D 1/249 |
| 2021/0303912 A1* | 9/2021 | Yu | G06T 7/11 |
| 2023/0394294 A1* | 12/2023 | Chiu | G06N 3/092 |

FOREIGN PATENT DOCUMENTS

| | | | |
|---|---|---|---|
| JP | 2009220592 A | 10/2009 |
| JP | 2017-111803 A | 6/2017 |
| JP | 2020093567 A | 6/2020 |
| JP | 2020126636 A | 8/2020 |

OTHER PUBLICATIONS

Invitation to Pay Additional Fees mailed Mar. 11, 2022 in connection with International Application No. PCT/JP2021/044817.
Heimberger et al., Computer vision in automated parking systems: Design, implementation and challenges. Image and Vision Computing. Apr. 26, 2021;68:88-101.
Rao et al., In-Vehicle Object-Level 3D Reconstruction of Traffic Scenes. IEEE, Transactions on Intelligent Transportation Systems. Jul. 28, 2020;22(12):7747-59.
Xinyu Huang et al., The ApolloScape Open Dataset for Autonomous Driving and its Application, arxiv.org, USA, arxiv.org, Jul. 4, 2019, p. 1-17, https://arxiv.org/abs/1803.06184.

* cited by examiner

Figure 7:
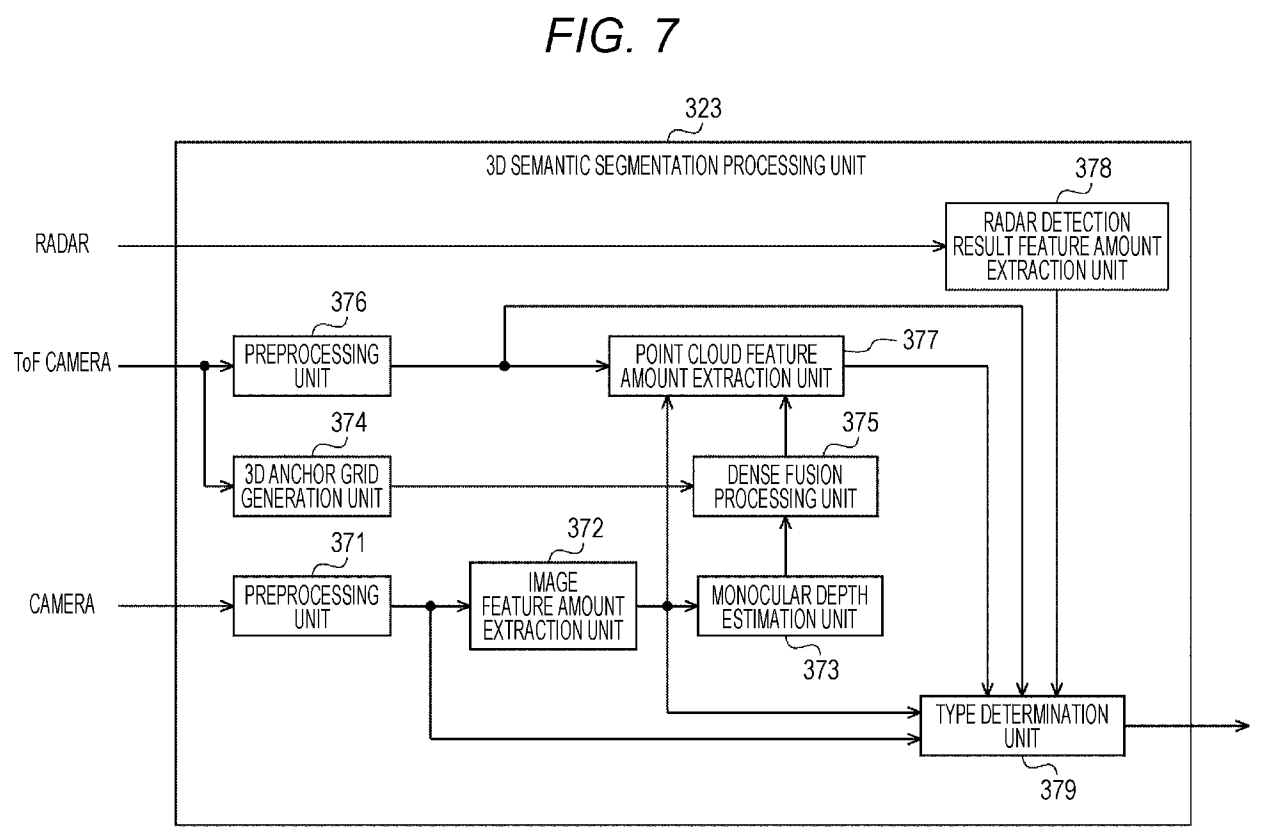

3D SEMANTIC SEGMENTATION PROCESSING UNIT

378 — RADAR DETECTION RESULT FEATURE AMOUNT EXTRACTION UNIT

377 — POINT CLOUD FEATURE AMOUNT EXTRACTION UNIT

375 — DENSE FUSION PROCESSING UNIT

373 — MONOCULAR DEPTH ESTIMATION UNIT

379 — TYPE DETERMINATION UNIT

376 — PREPROCESSING UNIT

374 — 3D ANCHOR GRID GENERATION UNIT

372 — IMAGE FEATURE AMOUNT EXTRACTION UNIT

371 — PREPROCESSING UNIT

RADAR

ToF CAMERA

CAMERA

FIG. 14

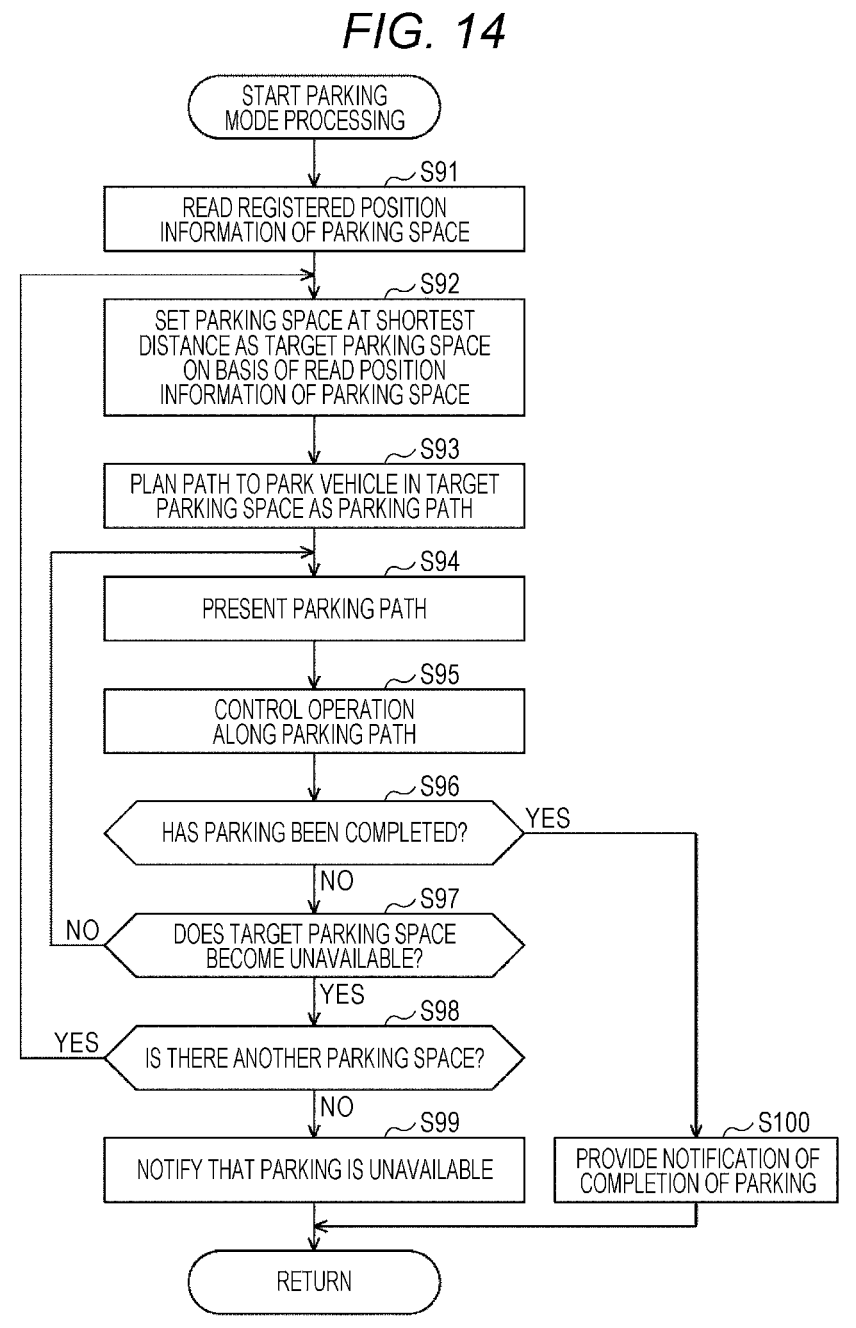

START PARKING
MODE PROCESSING

S91

READ REGISTERED POSITION
INFORMATION OF PARKING SPACE

S92

SET PARKING SPACE AT SHORTEST
DISTANCE AS TARGET PARKING SPACE
ON BASIS OF READ POSITION
INFORMATION OF PARKING SPACE

S93

PLAN PATH TO PARK VEHICLE IN TARGET
PARKING SPACE AS PARKING PATH

S94

PRESENT PARKING PATH

S95

CONTROL OPERATION
ALONG PARKING PATH

S96

HAS PARKING BEEN COMPLETED? — YES

NO

S97

DOES TARGET PARKING SPACE
BECOME UNAVAILABLE? — NO

YES

S98

IS THERE ANOTHER PARKING SPACE? — YES

NO

S99

NOTIFY THAT PARKING IS UNAVAILABLE

S100

PROVIDE NOTIFICATION OF
COMPLETION OF PARKING

RETURN

INFORMATION PROCESSING DEVICE, INFORMATION PROCESSING METHOD, AND PROGRAM

CROSS REFERENCE TO RELATED APPLICATIONS

This application is a National Stage filing under 35 U.S.C. § 371 of International Application No. PCT/US2021/044817, filed Dec. 7, 2021, which claims the benefit of US Priority Patent Application U.S. 63/128,297 filed on Dec. 21, 2020 and Japanese Priority Patent Application JP 2021-035452 filed on Mar. 5, 2021, the entire contents of which are incorporated herein by reference.

TECHNICAL FIELD

The present disclosure relates to an information processing device, an information processing method, and a program, and more particularly to an information processing device, an information processing method, and a program capable of implementing quick and smooth parking assistance close to a human sense without being affected by an environment of a parking space.

BACKGROUND ART

In recent years, there has been increasing interest in a parking assistance system. There are situations where vehicles are parked in various daily drive scenes, and a parking assistance system that is safer, more comfortable, and more convenient may be demanded.

For example, a technique of detecting a parking space on the basis of a camera image and performing parking assistance for parking in the detected parking space has been proposed (see PTL 1).

CITATION LIST

Patent Literature

PTL 1: JP 2017-111803A

SUMMARY OF INVENTION

Technical Problem

However, in the technique described in PTL 1, a parking space is not detected in consideration of depth information.

For this reason, in an environment where detection of a parking space is difficult if the depth is difficult to be recognized, the parking space is difficult to be discriminated with a sense close to a sense of a human detecting the parking space, and thus there is a possibility that smooth parking assistance is difficult to be implemented.

The present disclosure has been made in view of such a situation, and in particular implements quick and smooth parking assistance close to a human sense without being affected by an environment of a parking space.

Solution to Problem

An information processing device and a program according to one aspect of the present disclosure are an information processing device and a program including circuitry configured to: receive image data of surroundings of a vehicle; receive depth data of the surroundings of the vehicle;

generate, based on the image data and the depth data, a 3D semantic segmentation image having a plurality of pixel units, each pixel unit of the plurality of pixel units including the depth data and class information; and search for an available parking space based on the 3D semantic segmentation image.

An information processing method according to one aspect of the present disclosure is an information processing method including: generating image data of surroundings of a vehicle; generating depth data of the surroundings of the vehicle; generating, based on the image data and the depth data, a 3D semantic segmentation image having a plurality of pixel units, each pixel unit of the plurality of pixel units including the depth data and class information; and searching for an available parking space based on the 3D semantic segmentation image.

In one aspect of the present disclosure, image data of surroundings of a vehicle is acquired, depth data of the surroundings of the vehicle is acquired, a 3D semantic segmentation image having a plurality of pixel units, each pixel unit of the plurality of pixel units including the depth data and class information, are generated, an available parking space is searched for on the basis of the 3D semantic segmentation image.

BRIEF DESCRIPTION OF DRAWINGS

FIG. 2 is a diagram for describing an example of driving assistance by a parking assistance function.

FIG. 5 is a diagram illustrating an example of a sensing region.

FIG. 7 is a diagram illustrating a configuration example of a 3D semantic segmentation processing unit in FIG. 6.

FIG. 14 is a flowchart for describing parking mode processing.

DESCRIPTION OF EMBODIMENTS

Figure 1:
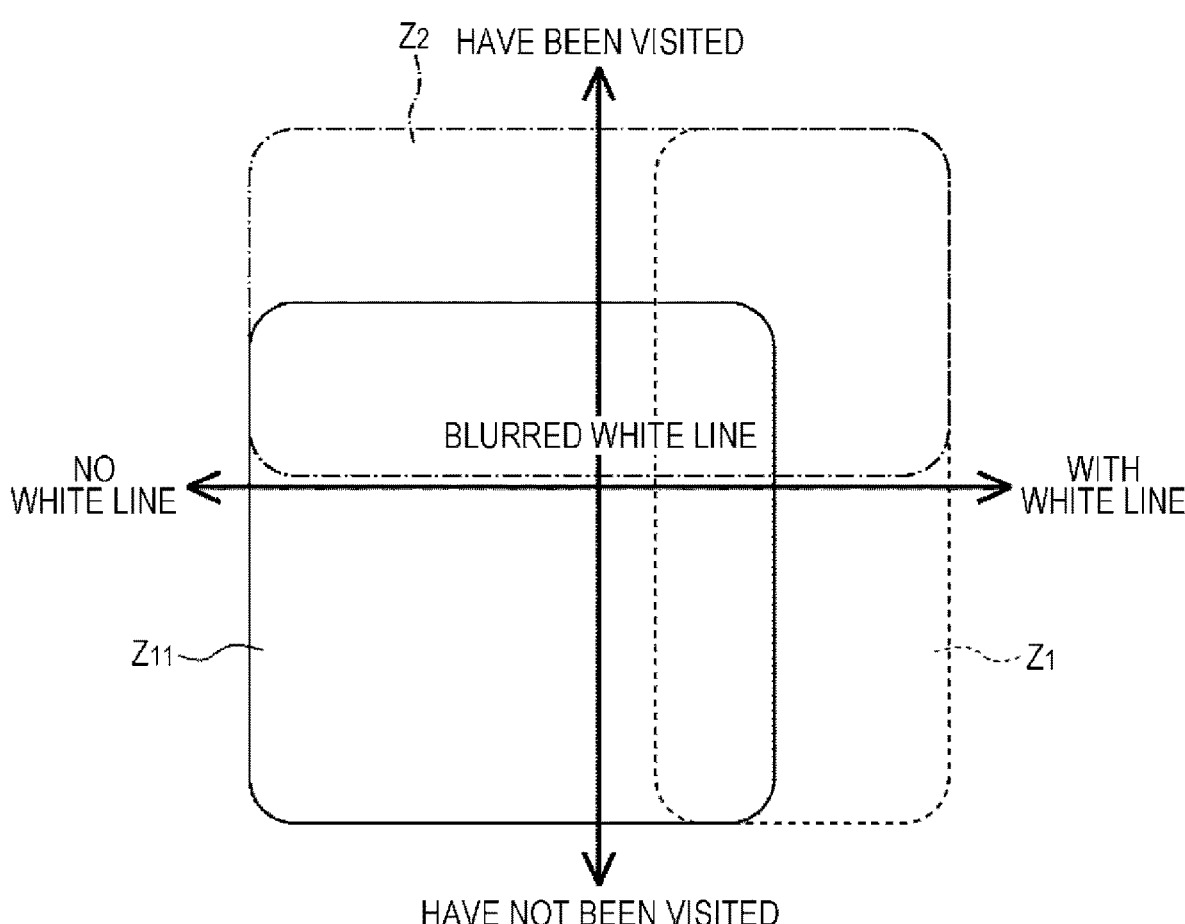
FIG. 1 is a diagram for describing restriction of a parking assistance function.

Favorable embodiments of the present disclosure will be described in detail below with reference to the accompanying drawings. Note that, in the present specification and the drawings, redundant description of constituent elements having substantially the same functional configurations is omitted by giving the same reference numerals.

Hereinafter, modes for carrying out the present technology will be described. Description will be given in the following order.

1. Outline of Present Disclosure
2. Configuration of Vehicle Control System
3. Configuration Example of Parking Assistance Control Unit That Implements Parking Assistance Function of Present Disclosure
4. Example of Execution by Software <<1. Outline of Present Disclosure>>

An outline of a technology for implementing quick and smooth parking assistance close to a human sense without being affected by an environment of a parking space to which the technology of the present disclosure is applied will be described.

Although a parking assistance function such as recognizing a parking space and automatically parking or guiding to an optimal parking path has already been commercialized in various forms, various restrictions are imposed in any case.

For example, in a first parking assistance function, as indicated by the dotted line in FIG. 1, parking is possible regardless of whether the parking space has been visited, that is, even in the parking space that is not registered in advance in a vehicle, but parking is not possible in the parking space having no white line or having a white line but blurred.

Furthermore, for example, in a second parking assistance function, as indicated by the one-dot chain line in FIG. 1, parking is possible regardless of the presence or absence of a white line, in the parking space with a white line or the parking space without a white line. However, the second parking assistance function functions only for the parking space that has been visited before, that is, the parking space registered in advance in the vehicle.

That is, to implement the above-described parking assistance function, conditions according to the presence or absence of a white line of a target parking space and whether or not the parking space is registered in advance are set. Note that, in FIG. 1, the horizontal axis represents the degree of presence or absence of a white line (whether or not a white line is present), and the vertical axis represents the degree of presence or absence of an event performed (whether or not pre-registration has been made).

Therefore, in a parking assistance function according to the present disclosure, as indicated by the solid line in FIG. 1, by appropriately recognizing a peripheral situation such as a parking space or a direction of parked vehicles (double parking or parallel parking) regardless of whether or not the target parking space is registered in advance in the vehicle (whether or not the target parking space has been visited) or the presence or absence of a white line, quick and smooth parking assistance is implemented as in a parking operation performed by a person.

Figure 2:
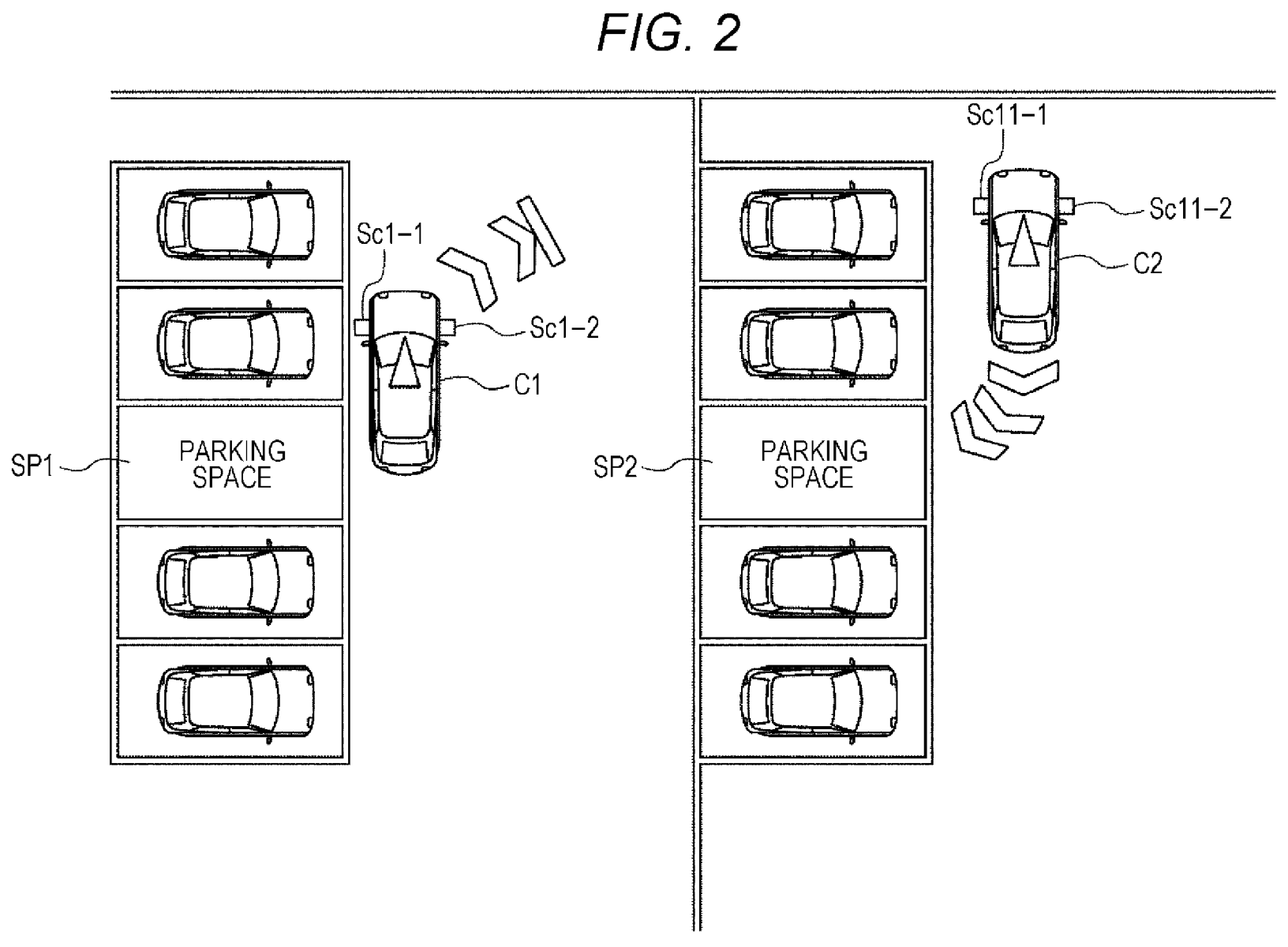

For example, as illustrated in the left part of FIG. 2, parking assistance in a case where a vehicle C1 provided with sensors Sc1-1 and Sc1-2 such as cameras on right and left of a main body is parked in a parking space SP1 will be considered.

Note that, in FIG. 2, the direction of the convex portion indicated by the isosceles of the isosceles triangle mark in the figure is assumed to be the front of the vehicle C1.

As illustrated in the left part of FIG. 2, the vehicle C1 needs to cross the front of the parking space SP1 at least once in order to detect the position of the parking space SP1, which is an empty space where parking is possible, by the sensor Sc1-1 attached to the left side.

Furthermore, for example, as illustrated in the right part of FIG. 2, parking assistance in a case where a vehicle C2 provided with sensors Sc11-1 and Sc11-2 such as ultrasonic sensors on right and left of a main body is parked in a parking space SP2 will be considered.

As in the right part of FIG. 2, the vehicle C2 needs to pass near the parking space SP2 at least once in order to detect the parking space SP2, which is an empty space where parking is possible, by the sensor Sc11-1 attached to the left side of the vehicle C2.

That is, as described with reference to FIG. 2, in the case of considering parking assistance by providing cameras, ultrasonic sensors, or the like on the right and left of the main body, it is necessary to pass through the front or near the target parking space in advance.

For this reason, in the example of the parking assistance described with reference to FIG. 2, it is difficult to visually search for a target empty space, determine the searched empty space as the target parking space, and start a parking operation, as in a case where a person performs the parking operation.

For this reason, in the case of performing parking using the above-described parking assistance, the vehicle continues to go around in a parking lot until the vehicle passes through the front or near the parking space that is an empty space.

At this time, in some cases, a person boarding the vehicle may go around even in a range where the person knows there is no empty space in order to search for a parking space although the person can visually recognize a parking space that is an empty space.

As a result, there is a possibility that unnecessary time is spent until parking is completed, and there is a possibility that the person boarding the vehicle does not feel that parking is fast and smooth and feels that the parking operation is uncomfortable.

Therefore, in a parking assistance function to which the technology of the present disclosure is applied, a situation of surroundings of a vehicle is recognized by object recognition processing using three-dimensional (3D) semantic segmentation, a parking space is specified, and then a parking operation is performed.

Figure 3:
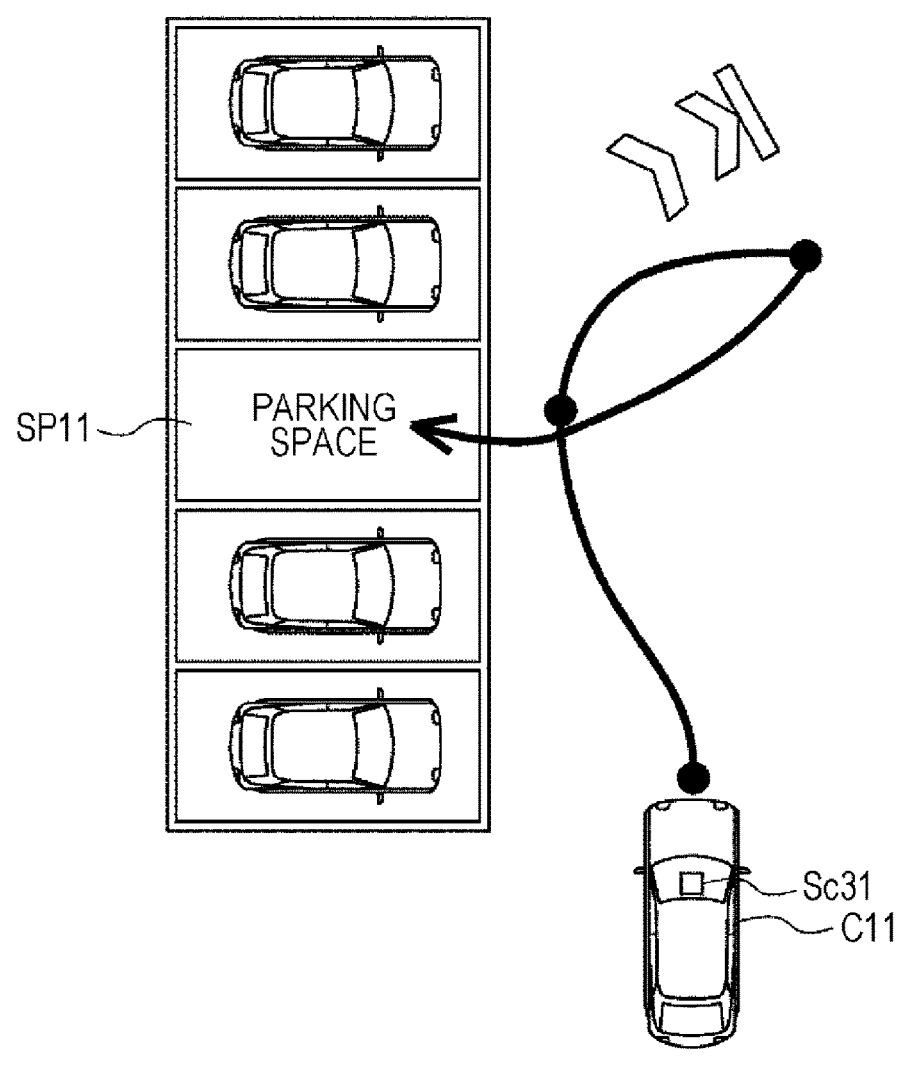
FIG. 3 is a diagram for describing an outline of a parking assistance function to which the technology of the present disclosure is applied.

For example, as illustrated in FIG. 3, a sensor Sc31 that detects an image and depth data is provided in front of a vehicle C11.

First, in the vehicle C11, the surrounding situation is recognized by performing the object recognition processing using 3D semantic segmentation based on the depth data and the image of the front detected by the sensor Sc31. Next, in the vehicle C11, an empty space to be a parking target is searched for in a range up to a position in front of the vehicle C11 by a predetermined distance (for example, a position at least 15 meters ahead from the vehicle or a position in front of the vehicle by 15 m to 30 m) on the basis of an object recognition result.

Then, when the empty space is searched for from a search result of the range in front of the vehicle C11 by a predetermined distance, the searched empty space is recognized as the parking space SP11 to be the parking target, a parking path for parking, for example, as indicated by the thick solid line in the figure is calculated, and the vehicle C11 is controlled to operate along the calculated parking path.

By implementing such a parking operation, the parking assistance similar to the case of a person's parking operation is performed, such as visually searching for an empty space and performing a parking operation when the searched empty space is recognized as a parking space.

As a result, it is possible to implement quick and smooth parking assistance that does not give a feeling of strangeness to a person who is an occupant.

Furthermore, since the surrounding situation is recognized by object recognition processing by 3D semantic segmentation and the parking space is specified, comfortable parking assistance can be implemented even in parking spaces in various places regardless of the environment of the parking spaces.

<<2. Configuration of Vehicle Control System>>

Figure 4:
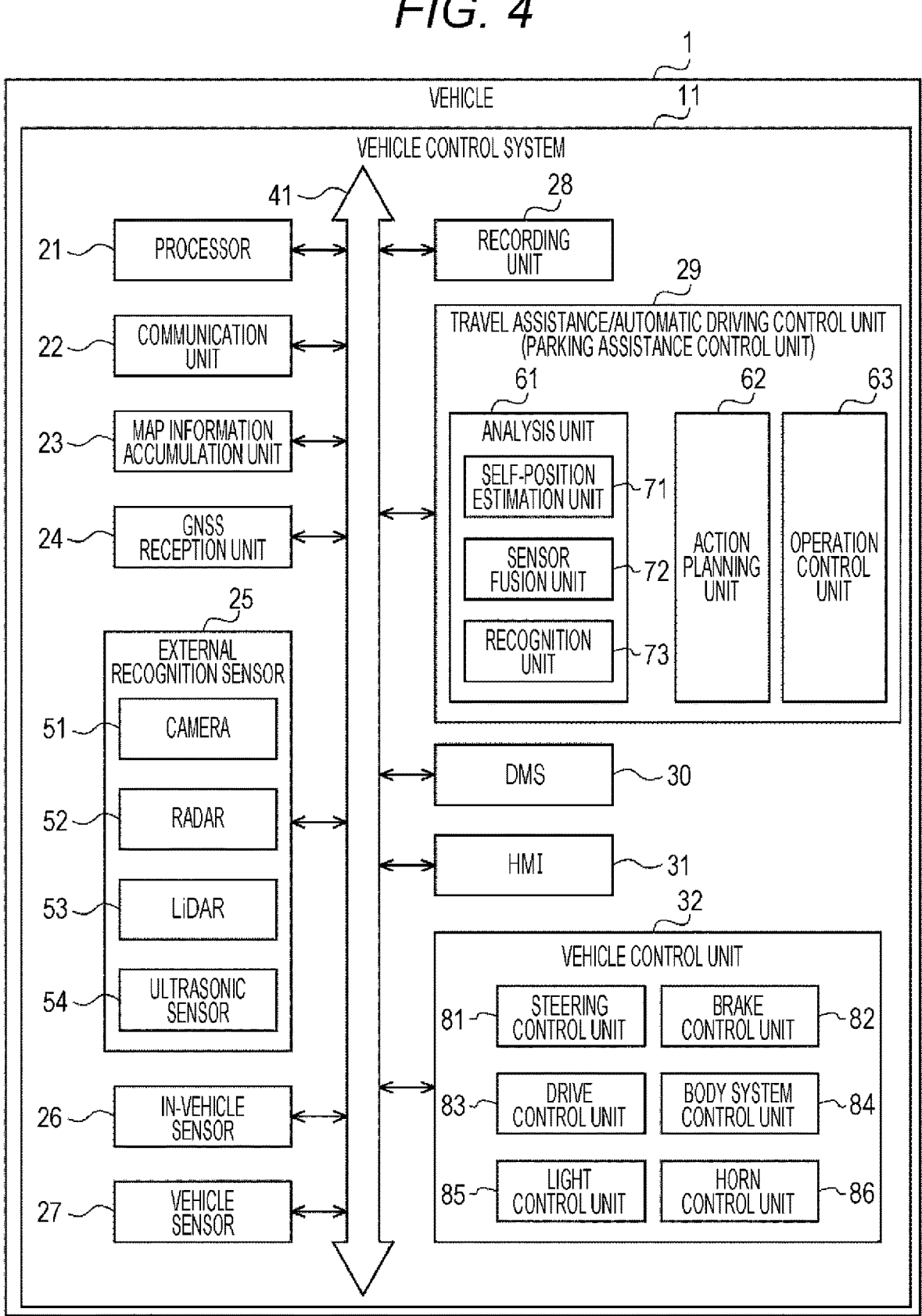
FIG. 4 is a block diagram illustrating a configuration example of a vehicle control system.

FIG. 4 is a block diagram illustrating a configuration example of a vehicle control system 11 that is an example of a mobile device control system to which the present technology is applied.

The vehicle control system 11 is provided in a vehicle 1 and performs processing related to travel assistance and automatic driving of the vehicle 1.

The vehicle control system 11 includes a processor 21, a communication unit 22, a map information accumulation unit 23, a global navigation satellite system (GNSS) reception unit 24, an external recognition sensor 25, an in-vehicle sensor 26, a vehicle sensor 27, a recording unit 28, a travel assistance/automatic driving control unit 29, a driver monitoring system (DMS) 30, a human machine interface (HMI) 31, and a vehicle control unit 32.

The processor 21, the communication unit 22, the map information accumulation unit 23, the GNSS reception unit 24, the external recognition sensor 25, the in-vehicle sensor 26, the vehicle sensor 27, the recording unit 28, the travel assistance/automatic driving control unit 29, the driver monitoring system (DMS) 30, the human machine interface (HMI) 31, and the vehicle control unit 32 are communicatively connected to one another via a communication network 41. The communication network 41 includes, for example, an in-vehicle communication network, a bus, or the like conforming to a digital bidirectional communication standard such as a controller area network (CAN), a local interconnect network (LIN), a local area network (LAN), FlexRay (registered trademark), or Ethernet (registered trademark). The communication network 41 may be selectively used depending on a type of data to be communicated. For example, CAN is applied to data related to vehicle control, and Ethernet is applied to large-capacity data. Note that each unit of the vehicle control system 11 may be directly connected using wireless communication that assumes communication at a relatively short distance, such as near field communication (NFC) or Bluetooth (registered trademark) without through the communication network 41.

Note that, hereinafter, in a case where the units of the vehicle control system 11 perform communication via the communication network 41, description of the communication network 41 is omitted. For example, in a case where the processor 21 and the communication unit 22 perform communication via the communication network 41, it is simply described that the processor 21 and the communication unit 22 perform communication.

The processor 21 includes various processors such as a central processing unit (CPU) and a micro processing unit (MPU). The processor 21 controls the entire vehicle control system 11.

The communication unit 22 communicates with various devices inside and outside the vehicle, other vehicles, servers, base stations, and the like, and transmits and receives various data. At this time, the communication unit 22 can perform communication using a plurality of communication methods.

Communication with an outside of the vehicle executable by the communication unit 22 will be schematically described. The communication unit 22 communicates with a server (hereinafter referred to as an external server) or the like existing on an external network via a base station or an access point by a wireless communication method such as 5th generation mobile communication system (5G), long term evolution (LTE), or dedicated short range communications (DSRC). The external network with which the communication unit 22 performs communication is, for example, the Internet, a cloud network, a network unique to a company, or the like. The communication method by which the communication unit 22 communicates with the external network is not particularly limited as long as the communication method is a wireless communication method capable of performing digital bidirectional communication at a communication speed equal to or higher than a predetermined speed and at a distance equal to or longer than a predetermined distance.

Furthermore, for example, the communication unit 22 can communicate with a terminal existing in a vicinity of host vehicle, using a peer to peer (P2P) technology. The terminal present in the vicinity of the host vehicle is, for example, a terminal worn by a moving body that moves at a relatively low speed such as a pedestrian or a bicycle, a terminal installed in a store or the like with a position fixed, or a machine type communication (MTC) terminal. Moreover, the communication unit 22 can also perform V2X communication. For example, the V2X communication refers to communication between the host vehicle and another, such as vehicle to vehicle communication, vehicle to infrastructure communication between a roadside device and the host vehicle, vehicle to home communication, and vehicle to pedestrian communication between a terminal possessed by a pedestrian and the host vehicle.

The communication unit 22 can receive, for example, a program for updating software for controlling the operation of the vehicle control system 11 from the outside. The communication unit 22 can further receive map information, traffic information, information of the surroundings of the vehicle 1, and the like from the outside. Furthermore, for example, the communication unit 22 can transmit information regarding the vehicle 1, the information of the surroundings of the vehicle 1, and the like to the outside. Examples of the information regarding the vehicle 1 transmitted to the outside by the communication unit 22 include data indicating a state of the vehicle 1, a recognition result by a recognition unit 73, and the like. Moreover, for example, the communication unit 22 performs communication corresponding to a vehicle emergency call system such as an e-call.

Communication with an inside of the vehicle executable by the communication unit 22 will be schematically described. The communication unit 22 can communicate with each device in the vehicle, using, for example, wireless communication. The communication unit 22 can perform wireless communication with an in-vehicle device by a communication method capable of performing digital bidirectional communication at a communication speed equal to or higher than a predetermined speed by wireless communication, such as wireless LAN, Bluetooth (registered trademark), NFC, or wireless USB (WUSB). The communication method is not limited thereto, and the communication unit 22 can also communicate with each device in the vehicle using wired communication. For example, the communication unit 22 can communicate with each device in the vehicle by wired communication via a cable connected to a connection terminal (not illustrated). The communication unit 22 can communicate with each device in the vehicle by a communication method capable of performing digital bidirectional communication at a communication speed equal to or higher than a predetermined speed by wired communication, such as universal serial bus (USB), high-definition multimedia interface (HDMI) (registered trademark), or mobile high-definition link (MHL).

Here, the in-vehicle device refers to, for example, a device that is not connected to the communication network 41 in the vehicle. As the in-vehicle device, for example, a mobile device or a wearable device carried by an occupant such as a driver, an information device brought into the vehicle and temporarily installed, or the like is assumed.

For example, the communication unit 22 receives an electromagnetic wave transmitted by a road traffic information communication system (vehicle information and communication system (VICS) (registered trademark)) such as a radio wave beacon, an optical beacon, or FM multiplex broadcasting.

The map information accumulation unit 23 accumulates one or both of a map acquired from the outside and a map created by the vehicle 1. For example, the map information accumulation unit 23 accumulates a three-dimensional high-precision map, a global map with lower precision than the high-precision map and covering a wide area, or the like.

The high-precision map is, for example, a dynamic map, a point cloud map, a vector map, or the like. The dynamic map is, for example, a map including four layers of dynamic information, semi-dynamic information, semi-static information, and static information, and is provided to the vehicle 1 from an external server or the like. The point cloud map is a map including point clouds (point cloud data). Here, the vector map refers to a map adapted to an advanced driver assistance system (ADAS) in which traffic information such as a lane and a signal position is associated with a point cloud map.

The point cloud map and the vector map may be provided from, for example, an external server or the like, or may be created by the vehicle 1 as a map for performing matching with a local map to be described below on the basis of a sensing result by a radar 52, a LiDAR 53, or the like and accumulated in the map information accumulation unit 23. Furthermore, in a case where the high-precision map is provided from an external server or the like, for example, map data of several hundred meters square regarding a planned path on which the vehicle 1 will travel from now is acquired from an external server or the like in order to reduce communication capacity.

The GNSS reception unit 24 receives a GNSS signal from a GNSS satellite and acquires position information of the vehicle 1. The received GNSS signal is supplied to the travel assistance/automatic driving control unit 29. Note that the GNSS reception unit 24 is not limited to the method using the GNSS signal, and may acquire the position information using, for example, a beacon.

The external recognition sensor 25 includes various sensors used for recognizing a situation outside the vehicle 1, and supplies sensor data from each sensor to each unit of the vehicle control system 11. The type and number of sensors included in the external recognition sensor 25 are arbitrary.

For example, the external recognition sensor 25 includes a camera 51, the radar 52, the light detection and ranging or laser imaging detection and ranging (LiDAR) 53, and an ultrasonic sensor 54. The present embodiment is not limited thereto, and the external recognition sensor 25 may include one or more types of sensors among the camera 51, the radar 52, the LiDAR 53, and the ultrasonic sensor 54. The numbers of cameras 51, radars 52, LiDARs 53, and ultrasonic sensors 54 are not particularly limited as long as they can be practically installed in the vehicle 1. Furthermore, the types of sensors included in the external recognition sensor 25 are not limited to this example, and the external recognition sensor 25 may include another type of sensor. An example of a sensing region of each sensor included in the external recognition sensor 25 will be described below.

Note that an imaging method of the camera 51 is not particularly limited as long as it is an imaging method capable of distance measurement. For example, as the camera 51, cameras of various imaging methods such as a time of flight (ToF) camera, a stereo camera, a monocular camera, and an infrared camera can be applied as necessary. The present embodiment is not limited thereto, and the camera 51 may simply acquire a captured image (captured image) regardless of distance measurement.

Furthermore, for example, the external recognition sensor 25 can include an environment sensor for detecting an environment for the vehicle 1. The environment sensor is a sensor for detecting an environment such as weather, climate, and brightness, and can include, for example, various sensors such as a raindrop sensor, a fog sensor, a sunshine sensor, a snow sensor, and an illuminance sensor.

Moreover, for example, the external recognition sensor 25 includes a microphone used for detecting a sound in the surroundings of the vehicle 1, a position of a sound source, and the like.

The in-vehicle sensor 26 includes various sensors for detecting information inside the vehicle, and supplies sensor data from each sensor to each unit of the vehicle control system 11. The types and the number of various sensors included in the in-vehicle sensor 26 are not particularly limited as long as they can be practically installed in the vehicle 1.

For example, the in-vehicle sensor 26 can include one or more sensors from a camera, a radar, a seating sensor, a steering wheel sensor, a microphone, and a biological sensor. As the camera included in the in-vehicle sensor 26, for example, cameras of various imaging methods capable of measuring a distance, such as a ToF camera, a stereo camera, a monocular camera, and an infrared camera, can be used. The present embodiment is not limited thereto, and the camera included in the in-vehicle sensor 26 may simply acquire a captured image regardless of distance measurement. The biological sensor included in the in-vehicle sensor 26 is provided, for example, on a seat, a steering wheel, or the like, and detects various types of biological information of an occupant such as a driver.

The vehicle sensor 27 includes various sensors for detecting a state of the vehicle 1, and supplies sensor data from each sensor to each unit of the vehicle control system 11. The types and the number of various sensors included in the vehicle sensor 27 are not particularly limited as long as they can be practically installed in the vehicle 1.

For example, the vehicle sensor 27 includes a speed sensor, an acceleration sensor, an angular velocity sensor (gyro sensor), and an inertial measurement unit (IMU) integrating these sensors. For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects a rotation speed of an engine or a motor, an air pressure sensor that detects an air pressure of a tire, a slip rate sensor that detects a slip rate of a tire, and a wheel speed sensor that detects a rotation speed of a wheel. For example, the vehicle sensor 27 includes a battery sensor that detects a remaining amount and temperature of a battery, and an impact sensor that detects an external impact.

The recording unit 28 includes at least one of a nonvolatile storage medium or a volatile storage medium, and stores data and a program. The recording unit 28 is used as, for example, an electrically erasable programmable read only memory (EEPROM) and a random access memory (RAM), and a magnetic storage device such as a hard disc drive (HDD), a semiconductor storage device, an optical storage device, or a magneto-optical storage device can be applied as the storage medium. The recording unit 28 records various programs and data used by each unit of the vehicle control system 11. For example, the recording unit 28 includes an event data recorder (EDR) and a data storage system for automated driving (DSSAD), and records information of the vehicle 1 before and after an event such as an accident.

The travel assistance/automatic driving control unit 29 controls travel assistance and automatic driving of the vehicle 1. For example, the travel assistance/automatic driving control unit 29 includes an analysis unit 61, an action planning unit 62, and an operation control unit 63. Furthermore, the travel assistance/automatic driving control unit 29 implements a function of a parking assistance control unit 201 (FIG. 6) that implements a parking assistance function of the present disclosure described below.

The analysis unit 61 performs analysis processing for a situation of the vehicle 1 and the surroundings. The analysis unit 61 includes a self-position estimation unit 71, a sensor fusion unit 72, and a recognition unit 73.

The self-position estimation unit 71 estimates a self-position of the vehicle 1 on the basis of the sensor data from the external recognition sensor 25 and the high-precision map accumulated in the map information accumulation unit 23. For example, the self-position estimation unit 71 generates a local map on the basis of the sensor data from the external recognition sensor 25, and estimates the self-position of the vehicle 1 by matching the local map with the high-precision map. The position of the vehicle 1 is based on, for example, a center of a rear wheel pair axle.

The local map is, for example, a three-dimensional high-precision map created using a technique such as simultaneous localization and mapping (SLAM), an occupancy grid map (OGM), or the like. The three-dimensional high-precision map is, for example, the above-described point cloud map. The occupancy grid map is a map in which a three-dimensional or two-dimensional space of the surroundings of the vehicle 1 is divided into grids (grids) of a predetermined size, and an occupancy state of an object is indicated in units of grids. The occupancy state of an object is indicated by, for example, the presence or absence or existence probability of the object. The local map is also used for detection processing and recognition processing of a situation outside the vehicle 1 by the recognition unit 73, for example.

Note that the self-position estimation unit 71 may estimate the self-position of the vehicle 1 on the basis of the GNSS signal and the sensor data from the vehicle sensor 27.

The sensor fusion unit 72 performs sensor fusion processing of combining a plurality of different types of sensor data (for example, the image data supplied from the camera 51 and the sensor data supplied from the radar 52) to obtain new information. Methods for combining different types of sensor data include integration, fusion, association, and the like.

The recognition unit 73 executes detection processing for detecting a situation outside the vehicle 1 and recognition processing for recognizing a situation outside the vehicle 1.

For example, the recognition unit 73 performs the detection processing and the recognition processing for the situation outside the vehicle 1 on the basis of information from the external recognition sensor 25, information from the self-position estimation unit 71, information from the sensor fusion unit 72, and the like.

Specifically, for example, the recognition unit 73 performs the detection processing, the recognition processing, and the like for an object in the surroundings of the vehicle 1. The object detection processing is, for example, processing of detecting the presence or absence, size, shape, position, movement, or the like of an object. The object recognition processing is, for example, processing of recognizing an attribute such as a type of an object or identifying a specific object. Note that the detection processing and the recognition processing are not necessarily clearly divided and may overlap.

For example, the recognition unit 73 detects the object in the surroundings of the vehicle 1 by performing clustering to classify point clouds based on sensor the data by the LiDAR 53, the radar 52, or the like into each cluster of point clouds. As a result, the presence or absence, size, shape, and position of the object in the surroundings of the vehicle 1 are detected.

For example, the recognition unit 73 detects the movement of the object in the surroundings of the vehicle 1 by performing tracking for following the movement of the cluster of point clouds classified by the clustering. As a result, a speed and a traveling direction (movement vector) of the object in the surroundings of the vehicle 1 are detected.

For example, the recognition unit 73 recognizes the type of the object in the surroundings of the vehicle 1 by performing object recognition processing such as semantic segmentation for the image data supplied from the camera 51.

Note that, as the object to be detected or recognized by the recognition unit 73, for example, a vehicle, a person, a bicycle, an obstacle, a structure, a road, a traffic light, a traffic sign, or a road sign is assumed.

For example, the recognition unit 73 can perform the recognition processing for traffic rules in the surroundings of the vehicle 1 on the basis of the map accumulated in the map information accumulation unit 23, the estimation result of the self-position by the self-position estimation unit 71, and the recognition result of the object in the surroundings of the vehicle 1 by the recognition unit 73. Through this processing, the recognition unit 73 can recognize the position and state of the traffic light, the content of the traffic sign and the road sign, the content of traffic regulation, a travelable lane, and the like.

For example, the recognition unit 73 can perform the recognition processing for the environment in the surroundings of the vehicle 1. As the surrounding environment to be recognized by the recognition unit 73, weather, temperature, humidity, brightness, a state of a road surface, and the like are assumed.

The action planning unit 62 creates an action plan of the vehicle 1. For example, the action planning unit 62 creates an action plan by performing processing of path planning and path following.

Note that global path planning is processing of planning a rough path from the start to the goal. This path plan is called route plan, and includes processing of generating a route (local path planning) that enables safe and smooth traveling in the vicinity of the vehicle 1 in consideration of motion characteristics of the vehicle 1 in the path planned by the path plan.

The path following is processing of planning an operation for safely and accurately traveling the path planned by the path plan within a planned time. For example, the action planning unit 62 can calculate a target speed and a target angular velocity of the vehicle 1 on the basis of a result of the path following processing.

The operation control unit 63 controls the operation of the vehicle 1 in order to implement an action plan created by the action planning unit 62.

For example, the operation control unit 63 controls a steering control unit 81, a brake control unit 82, and a drive control unit 83 included in the vehicle control unit 32 to be described below, and performs acceleration/deceleration control and direction control such that the vehicle 1 travels on the route calculated by the route plan. For example, the operation control unit 63 performs cooperative control for the purpose of implementing functions of the ADAS such as collision avoidance or impact mitigation, follow-up traveling, vehicle speed maintaining traveling, collision warning of the host vehicle, lane deviation warning of the host vehicle, and the like. For example, the operation control unit 63 performs cooperative control for the purpose of automatic driving or the like in which the vehicle autonomously travels without depending on the operation of the driver.

The DMS 30 performs authentication processing for the driver, recognition processing for the state of the driver, and the like on the basis of the sensor data from the in-vehicle sensor 26, input data input to the HMI 31 to be described below, and the like. In this case, as the state of the driver to be recognized by the DMS 30, for example, a physical condition, a wakefulness level, a concentration level, a fatigue level, a line-of-sight direction, a drunkenness level, a driving operation, a posture, and the like are assumed.

Note that the DMS 30 may perform the authentication processing for an occupant other than the driver and the recognition processing for the state of the occupant. Furthermore, for example, the DMS 30 may perform the recognition processing for a situation inside the vehicle on the basis of the sensor data from the in-vehicle sensor 26. As the situation inside the vehicle to be recognized, for example, temperature, humidity, brightness, odor, and the like are assumed.

The HMI 31 inputs various data, instructions, and the like, and presents various data to the driver or the like.

The data input by the HMI 31 will be schematically described. The HMI 31 includes an input device for a person to input data. The HMI 31 generates an input signal on the basis of data, an instruction, or the like input by the input device, and supplies the input signal to each unit of the vehicle control system 11. The HMI 31 includes an operating element such as a touch panel, a button, a switch, or a lever as the input device. The data input is not limited thereto, and the HMI 31 may further include an input device capable of inputting information by a method other than manual operation such as voice, gesture, or the like. Moreover, the HMI 31 may use, for example, a remote control device using infrared rays or radio waves, or an external connection device such as a mobile device or a wearable device corresponding to the operation of the vehicle control system 11, as the input device.

The data presentation by the HMI 31 will be schematically described. The HMI 31 generates visual information, auditory information, and tactile information for the occupant or the outside of the vehicle. Furthermore, the HMI 31 performs output control for controlling an output, output content, output timing, output method, and the like of each piece of generated information. The HMI 31 generates and outputs, as the visual information, information indicated by an image and light such as an operation screen, a state display of the vehicle 1, a warning display, or a monitor image indicating the situation of the surroundings of the vehicle 1. Furthermore, the HMI 31 generates and outputs, as the auditory information, information indicated by sounds such as a voice guidance, a warning sound, or and a warning message. Moreover, the HMI 31 generates and outputs, as the tactile information, information given to the tactile sense of the occupant by, for example, force, vibration, motion, or the like.

As an output device from which the HMI 31 outputs the visual information, for example, a display device that presents the visual information by displaying an image by itself or a projector device that presents the visual information by projecting an image can be applied. Note that the display device may be a device that displays the visual information in the field of view of the occupant, such as a head-up display, a transmissive display, or a wearable device having an augmented reality (AR) function, in addition to a display device having a normal display. Furthermore, in the HMI 31, a display device included in a navigation device, an instrument panel, a camera monitoring system (CMS), an electronic mirror, a lamp, or the like provided in the vehicle 1 can also be used as an output device that outputs the visual information.

As an output device from which the HMI 31 outputs the auditory information, for example, an audio speaker, a headphone, or an earphone can be applied.

As an output device from which the HMI 31 outputs the tactile information, for example, a haptic element using a haptic technology can be applied. The haptics element is provided at, for example, a portion with which the occupant of the vehicle 1 comes into contact, such as a steering wheel or a seat.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 detects and controls a state of a steering system of the vehicle 1, and the like. The steering system includes, for example, a steering mechanism including a steering wheel and the like, an electric power steering, and the like. The steering control unit 81 includes, for example, a control unit such as an ECU that controls the steering system, an actuator that drives the steering system, and the like.

The brake control unit 82 detects and controls a state of a brake system of the vehicle 1, and the like. The brake system includes, for example, a brake mechanism including a brake pedal, an antilock brake system (ABS), a regenerative brake mechanism, and the like. The brake control unit 82 includes, for example, a control unit such as an ECU that controls the brake system.

The drive control unit 83 detects and controls a state of a drive system of the vehicle 1, and the like. The drive system includes, for example, a driving force generation device for generating a driving force such as an accelerator pedal, an internal combustion engine, or a driving motor, a driving force transmission mechanism for transmitting the driving force to wheels, and the like. The drive control unit 83 includes, for example, a control unit such as an ECU that controls the drive system.

The body system control unit 84 detects and controls a state of a body system of the vehicle 1, and the like. The body system includes, for example, a keyless entry system, a smart key system, a power window device, a power seat, an air conditioner, an airbag, a seat belt, a shift lever, and the like. The body system control unit 84 includes, for example, a control unit such as an ECU that controls the body system.

The light control unit 85 detects and controls states of various lights of the vehicle 1, and the like. As the light to be controlled, for example, a headlight, a backlight, a fog light, a turn signal, a brake light, a projection, a display of a bumper, and the like are assumed. The light control unit 85 includes a control unit such as an ECU that performs the light control.

The horn control unit 86 detects and controls a state of a car horn of the vehicle 1, and the like. The horn control unit 86 includes, for example, a control unit such as an ECU that controls the car horn.

Figure 5:
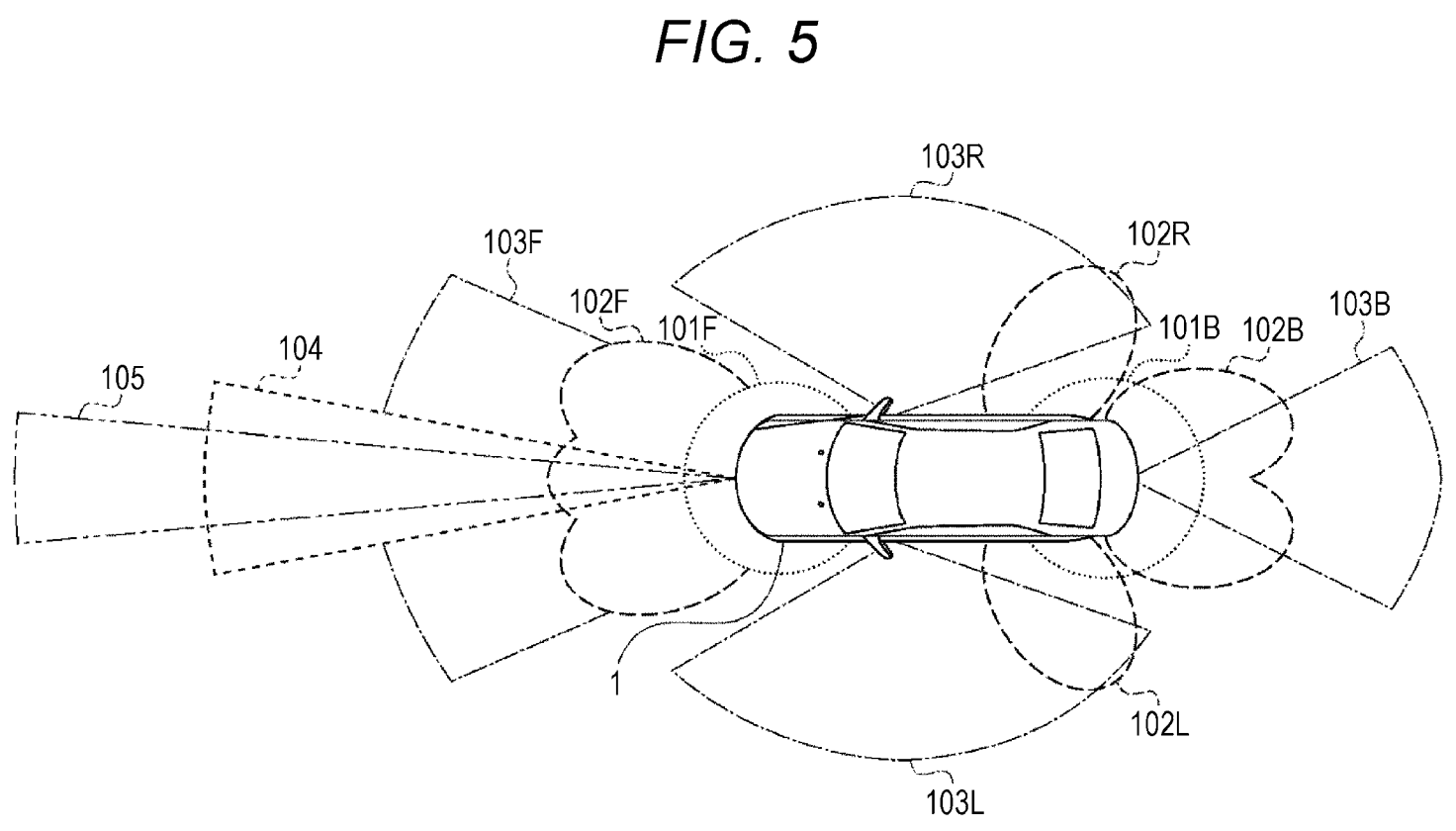

FIG. 5 is a diagram illustrating an example of a sensing region by the camera 51, the radar 52, the LiDAR 53, the ultrasonic sensor 54, and the like of the external recognition sensor 25 in FIG. 4. Note that FIG. 5 schematically illustrates a state of the vehicle 1 as viewed from above, where the left end side is the front end (front) side of the vehicle 1 and the right end side is the rear end (rear) side of the vehicle 1.

A sensing region 101F and a sensing region 101B illustrate examples of the sensing regions of the ultrasonic sensor 54. The sensing region 101F covers a periphery of the front end of the vehicle 1 by the plurality of ultrasonic sensors 54. The sensing region 101B covers a periphery of the rear end of the vehicle 1 by the plurality of ultrasonic sensors 54.

Sensing results in the sensing region 101F and the sensing region 101B are used for, for example, parking assistance of the vehicle 1.

Sensing regions 102F to 102B illustrate examples of sensing regions of the radar 52 for short range or middle range. The sensing region 102F covers a position farther than the sensing region 101F in front of the vehicle 1. The sensing region 102B covers a position farther than the sensing region 101B in the rear of the vehicle 1. The sensing region 102L covers a rear periphery of a left side surface of the vehicle 1. The sensing region 102R covers a rear periphery of a right side surface of the vehicle 1.

A sensing result in the sensing region 102F is used to detect a vehicle, a pedestrian, or the like existing in front of the vehicle 1, for example. A sensing result in the sensing region 102B is used for a collision prevention function or the like in the rear of the vehicle 1, for example. Sensing results in the sensing region 102L and the sensing region 102R are used to detect an object in a blind spot on sides of the vehicle 1, for example.

Sensing regions 103F to 103B illustrate examples of sensing regions by the camera 51. The sensing region 103F covers a position farther than the sensing region 102F in front of the vehicle 1. The sensing region 103B covers a position farther than the sensing region 102B in the rear of the vehicle 1. The sensing region 103L covers a periphery of the left side surface of the vehicle 1. The sensing region 103R covers a periphery of the right side surface of the vehicle 1.

A sensing result in the sensing region 103F can be used for, for example, recognition of a traffic light or a traffic sign, a lane deviation prevention assist system, and an automatic headlight control system. A sensing result in the sensing region 103B can be used for, for example, parking assistance and a surround view system. Sensing results in the sensing region 103L and the sensing region 103R can be used for a surround view system, for example.

A sensing region 104 illustrates an example of a sensing region of the LiDAR 53. The sensing region 104 covers a position farther than the sensing region 103F in front of the vehicle 1. Meanwhile, the sensing region 104 has a narrower range in a light-left direction than the sensing region 103F.

A sensing result in the sensing region 104 is used to detect an object such as a surrounding vehicle, for example.

A sensing region 105 illustrates an example of a sensing region of the radar 52 for long range. The sensing region 105 covers a position farther than the sensing region 104 in front of the vehicle 1. Meanwhile, the sensing region 105 has a narrower range in a light-left direction than the sensing region 104.

A sensing result in the sensing region 105 is used for, for example, adaptive cruise control (ACC), emergency braking, collision avoidance, and the like.

Note that the sensing regions of the sensors of the camera 51, the radar 52, the LiDAR 53, and the ultrasonic sensor 54 included in the external recognition sensor 25 may have various configurations other than those in FIG. 5. Specifically, the ultrasonic sensor 54 may also sense a side of the vehicle 1, or the LiDAR 53 may sense the rear of the vehicle 1. Furthermore, the installation position of each sensor is not limited to the above-described each example. Furthermore, the number of sensors may be one or more.

<<3. Configuration Example of Parking Assistance Control Unit that Implements Parking Assistance Function of Present Disclosure>>

Next, a configuration example of the parking assistance control unit 201 that implements the parking assistance function of the present disclosure will be described with reference to FIG. 6.

The parking assistance control unit 201 is implemented by the above-described travel assistance/automatic driving control unit 29 in the vehicle control system 11.

The parking assistance control unit 201 implements the parking assistance function on the basis of the image data, depth data (distance measurement results), and radar detection results supplied from cameras 202-1 to 202-q, the ToF cameras 203-1 to 203-r, and the radars 204-1 to 204-s.

Note that the cameras 202-1 to 202-q, the ToF cameras 203-1 to 203-r, and the radars 204-1 to 204-s will be simply referred to as the camera(s) 202, the ToF camera(s) 203, and the radar(s) 204, respectively, in a case where it is not particularly necessary to distinguish them, and other configurations will be similarly referred to.

The camera 202 and the ToF camera 203 have a configuration corresponding to the camera 51 in FIG. 4, and the radar 204 has a configuration corresponding to the radar 52 in FIG. 4.

Figure 6:
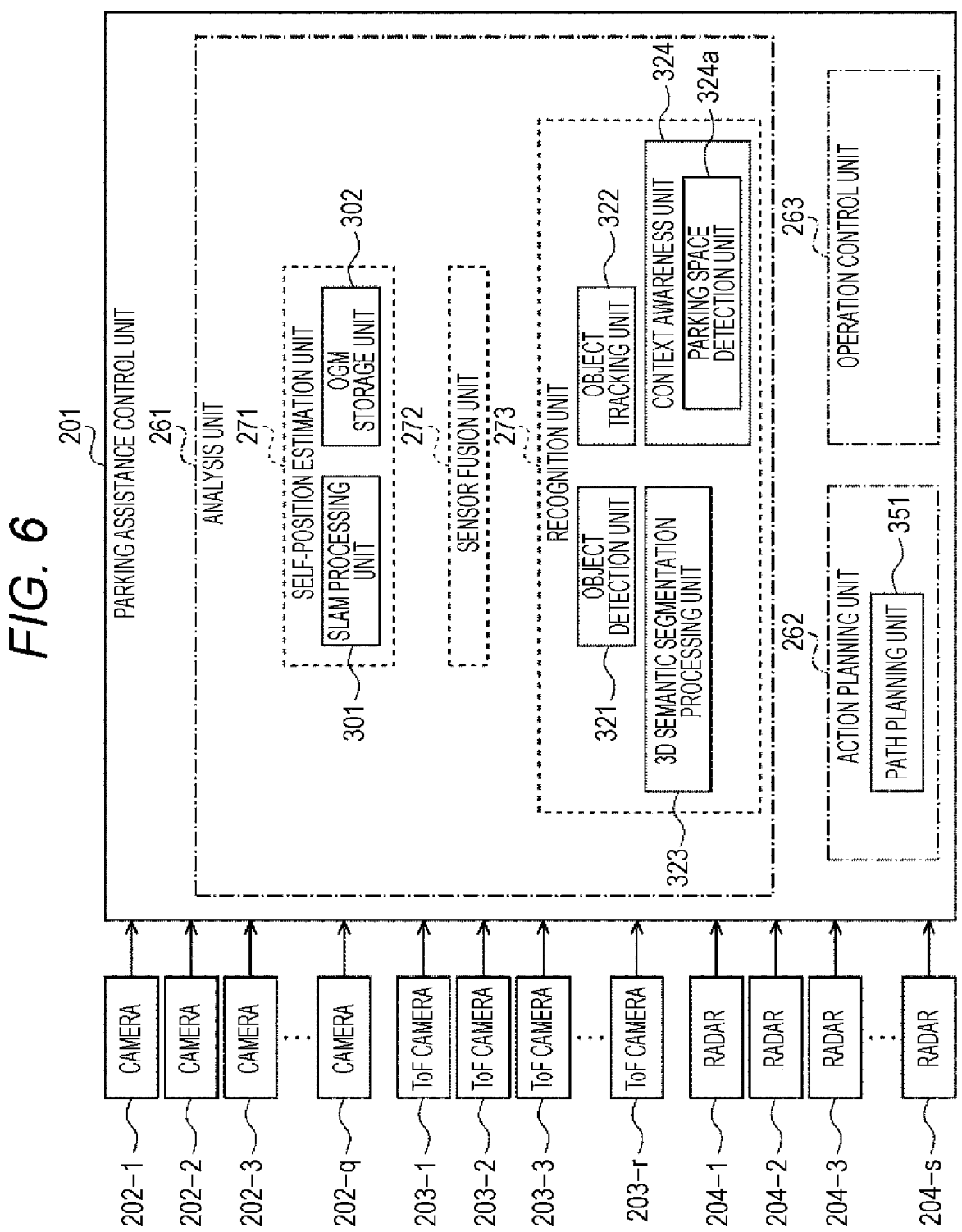
FIG. 6 is a diagram for describing a configuration example of a parking assistance control unit of the present disclosure.

Note that the parking assistance control unit 201 may implement the parking assistance function by using the detection results of the various configurations of the external recognition sensor 25 and the vehicle sensor 27 in FIG. 4 in addition to the detection results of the cameras 202-1 to 202-*q*, the ToF cameras 203-1 to 203-*r*, and the radars 204-1 to 204-*s* in FIG. 6.

The parking assistance control unit 201 associates the image data with the depth data in units of pixels of the image data on the basis of the image data and the depth data supplied from the camera 202, the ToF camera 203, and the radar 204. Now, the pixel-based depth data in the claims is an example of the depth data in units of pixels of the image data.

The parking assistance control unit 201 executes 3D semantic segmentation processing using the information including the image data, the depth data, and the radar detection result in addition to the depth data associated in units of pixels, and generates a 3D semantic segmentation image in which the depth data and the object recognition result are associated in units of pixels.

The parking assistance control unit 201 searches for a parking space on the basis of the 3D semantic segmentation image and assists a parking operation of the vehicle 1 to the searched parking space.

At this time, the parking assistance control unit 201 operates in two operation modes of a parking space search mode and a parking mode to implement the parking assistance function.

That is, first, the parking assistance control unit 201 operates in the parking space search mode, searches for a parking space on the basis of the 3D semantic segmentation image, and stores a search result.

Then, when the parking space is searched for, the parking assistance control unit 201 switches the operation mode to the parking mode, plans a path to the searched parking space, and controls the operation of the vehicle 1 so as to complete the parking with the planned path.

By implementing the parking assistance function by such an operation, the parking operation is performed after the search for the parking space is performed as in the case where the human performs the parking operation, so that quick and smooth parking assistance can be implemented.

More specifically, the parking assistance control unit 201 includes an analysis unit 261, an action planning unit 262, and an operation control unit 263.

The analysis unit 261 has a configuration corresponding to the analysis unit 61 in FIG. 4, the action planning unit 262 has a configuration corresponding to the action planning unit 62 in FIG. 4, and the operation control unit 263 has a configuration corresponding to the operation control unit 63 in FIG. 4.

The analysis unit 261 includes a self-position estimation unit 271, a sensor fusion unit 272, and a recognition unit 273.

The self-position estimation unit 271, the sensor fusion unit 272, and the recognition unit 273 have configurations corresponding to the self-position estimation unit 71, the sensor fusion unit 72, and the recognition unit 73 in FIG. 4, respectively.

The self-position estimation unit 271 includes a simultaneous localization and mapping (SLAM) processing unit 301 and an occupancy grid map (OGM) storage unit 302 as functions for implementing automatic parking assistance processing.

The simultaneous localization and mapping (SLAM) processing unit 301 simultaneously performs self-position estimation and peripheral map creation for implementing the automatic parking assistance function. Specifically, the SLAM processing unit 301 performs the self-position estimation and creates a peripheral three-dimensional map as, for example, an occupancy grid map (OGM) on the basis of information (hereinafter also simply referred to as integrated information) obtained by integrating (fusing or uniting) the information from the plurality of sensors supplied from the sensor fusion unit 272, and stores the created map in the OGM storage unit 302.

The OGM storage unit 302 stores OGM created by the SLAM processing unit 301, and supplies the OGM to the action planning unit 262 as necessary.

The recognition unit 273 includes an object detection unit 321, an object tracking unit 322, a 3D semantic segmentation processing unit 323, and a context awareness unit 324.

The object detection unit 321 detects an object by detecting, for example, the presence or absence, size, shape, position, movement, and the like of the object on the basis of the integration information supplied from the sensor fusion unit 272. The object tracking unit 322 tracks the object detected by the object detection unit 321.

The 3D semantic segmentation processing unit 323 executes three-dimensional semantic segmentation (3D semantic segmentation) on the basis of the image data imaged by the camera 202, the depth data (distance measurement result, sensor-based depth data) detected by the ToF camera 203, and the detection result of the radar 204, and generates a 3D semantic segmentation result. Note that a detailed configuration of the 3D semantic segmentation processing unit 323 will be described below with reference to FIG. 7.

The context awareness unit 324 includes, for example, a recognizer on which machine learning using a deep neural network (DNN, first neural network) or the like has been performed, and recognizes a situation (for example, a parking space) from a relationship between an object and an object on the basis of the 3D semantic segmentation result.

More specifically, the context awareness unit 324 includes a parking space detection unit 324*a*, and causes the parking space detection unit 324*a* to detect a parking space from the relationship between an object and an object on the basis of the 3D semantic segmentation result.

For example, the parking space detection unit 324*a* recognizes and detects the parking space from a mutual relationship among a plurality of object recognition results, such as a space surrounded by a frame such as a white line having a size that allows the vehicle to be parked, a space having a size that allows the vehicle to be parked and having a wheel stop without the white line, and a space having a size that allows the vehicle to be parked, which is present between the vehicle and a pillar, on the basis of the 3D semantic segmentation result.

The action planning unit 262 includes a path planning unit 351, and plans a path from the current position of the host vehicle to parking in the detected parking space when the parking space is detected by the recognition unit 273. The operation control unit 263 controls the operation of the vehicle 1 in order to implement the action plan created by the action planning unit 262 until the vehicle 1 is parked in the parking space recognized by the recognition unit 273.

<Configuration Example of 3D Semantic Segmentation Processing Unit>

Next, a configuration example of the 3D semantic segmentation processing unit 323 will be described with reference to FIG. 7.

The 3D semantic segmentation processing unit 323 includes a preprocessing unit 371, an image feature amount extraction unit 372, a monocular depth estimation unit 373, a 3D anchor grid generation unit 374, a dense fusion processing unit 375, a preprocessing unit 376, a point cloud feature amount extraction unit 377, a radar detection result feature amount extraction unit 378, and a type determination unit 379.

The preprocessing unit 371 applies predetermined preprocessing (contrast correction, edge enhancement, or the like) to the image data supplied in time series from the camera 202, and outputs the image data to the image feature amount extraction unit 372 and the type determination unit 379.

The image feature amount extraction unit 372 extracts a feature amount of an image as an image feature amount from the preprocessed image data, and outputs the image feature amount to the monocular depth estimation unit 373, the point cloud feature amount extraction unit 377, and the type determination unit 379.

The monocular depth estimation unit 373 estimates monocular depth (distance measurement image) on the basis of the image feature amount and outputs the monocular depth to the dense fusion processing unit 375 as dense depth data (depth data based on the image, image-based depth data). For example, the monocular depth estimation unit 373 estimates the monocular depth (distance measurement image) using information of distance from a vanishing point in one piece of two-dimensional image data to a feature point from which the image feature amount is extracted, and outputs the estimated monocular depth to the dense fusion processing unit 375 as dense depth data.

The 3D anchor grid generation unit 374 generates a 3D anchor grid in which three dimensional anchor positions are formed in a lattice shape on the basis of the distance measurement result detected by the ToF camera 203, and outputs the 3D anchor grid to the dense fusion processing unit 375.

The dense fusion processing unit 375 generates dense fusion by fusing the 3D anchor grid supplied from the 3D anchor grid generation unit 374 and the dense depth supplied from the monocular depth estimation unit 373, and outputs the dense fusion to the point cloud feature amount extraction unit 377.

The preprocessing unit 376 applies preprocessing such as noise removal to the point cloud data including the distance measurement result supplied from the ToF camera 203, and outputs the preprocessed point cloud data to the point cloud feature amount extraction unit 377 and the type determination unit 379.

The point cloud feature amount extraction unit 377 extracts a point cloud feature amount from the preprocessed point cloud data supplied from the preprocessing unit 376 and outputs the point cloud feature amount to the type determination unit 379 on the basis of the image feature amount supplied from the image feature amount extraction unit 372 and the dense fusion supplied from the dense fusion processing unit 375.

The radar detection result feature amount extraction unit 378 extracts a radar detection result feature amount from the detection result of the radar 204 supplied from the radar 204, and outputs the radar detection result feature amount to the type determination unit 379.

The type determination unit 379 associates the depth data in each pixel of the image data supplied from the preprocessing unit 376 on the basis of the point cloud data (depth data) supplied from the preprocessing unit 371, thereby associating the depth data in units of pixels in the image data. At this time, the type determination unit 379 may generate depth data obtained by synthesizing the point cloud data and the radar detection result of the radar 204 (depth data (point cloud) based on the radar detection result) as necessary, and associate the depth data in units of pixels in the image data. Thereby, the ToF camera 203 can be complemented. That is, for example, even in a scene where the degree of reliability of the ToF camera 203 is lower than a predetermined threshold value due to fog or the like, distance measurement can be performed without lowering the degree of reliability than the predetermined threshold by using the radar detection result of the radar 204 that uses radio waves. In this case, the radar 204 is desirably a so-called imaging radar having a high resolution similar to the camera 202. Furthermore, since the speed relative to an object can be calculated using the radar detection result by the radar 204, whether or not the object is moving can be calculated, and the object recognition performance can be improved by adding speed information in units of pixels, for example. More specifically, the object recognition accuracy can be improved by implementing object recognition processing using six parameters (x, y, z, vx, vy, and vz) for each pixel. Note that vx, vy, and vz are the speed information in x, y, and z directions, respectively.

Furthermore, the type determination unit 379 includes, for example, a recognizer that executes 3D semantic segmentation processing using machine learning such as deep neural network (DNN, second neural network), and applies the object recognition processing in units of pixels of image data on the basis of the image feature amount supplied from the image feature amount extraction unit 372, the point cloud feature amount supplied from the point cloud feature amount extraction unit 377, and the radar detection result feature amount supplied from the radar detection result feature amount extraction unit 378 to specify a type (class). Note that the deep neural network used in the Context Awareness may be different from or may be the same as the deep neural network used in 3D Semantic Segmentation.

Figure 8:
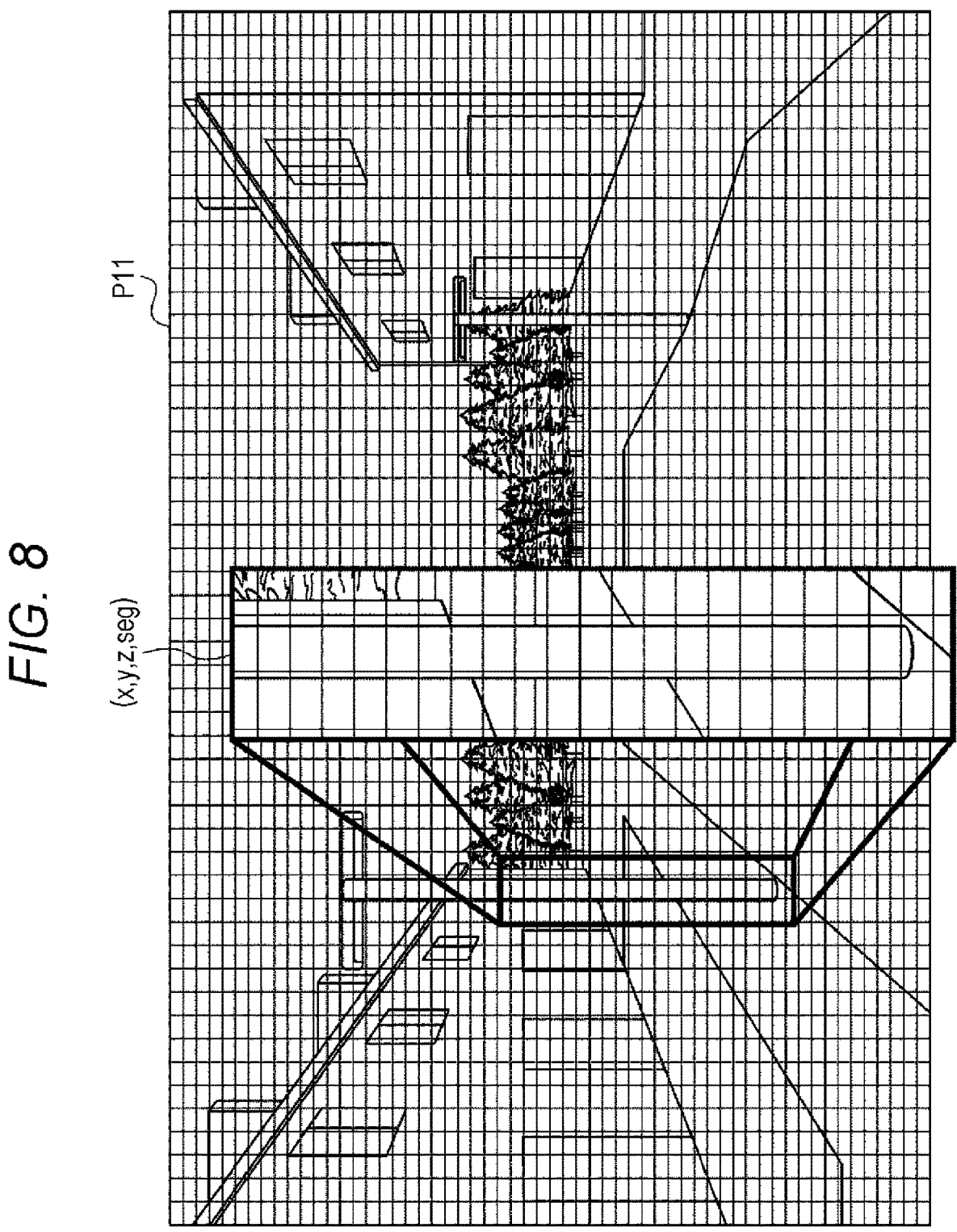
FIG. 8 is a diagram illustrating 3D semantic segmentation information.

That is, for example, as illustrated in FIG. 8, the type determination unit 379 associates the depth data (x, y, z) in units of pixels indicated by the grid of an image P11. Moreover, the type determination unit 379 determines the type (class) (seg) by executing the 3D semantic segmentation processing in units of pixels on the basis of the depth data, the image feature amount, the point cloud feature amount, and the radar detection result feature amount. Then, the type determination unit 379 sets 3D semantic segmentation information (x, y, z, seg) by associating the type determination result and the depth data in units of pixels.

The type determination unit 379 generates an image including the 3D semantic segmentation information (x, y, z, seg) set in units of pixels as a 3D semantic segmentation image. As a result, the 3D semantic segmentation image is an image in which a region for each type (class) is formed in the image.

The type (class) recognized as an object by the object recognition processing is, for example, a roadway, a sidewalk, a pedestrian, a rider of a bicycle or a motorcycle, a vehicle, a truck, a bus, a motorcycle, a bicycle, a building, a wall, a guardrail, a bridge, a tunnel, a pole, a traffic sign, a traffic signal, a white line, or the like. For example, in a pixel classified as a vehicle as a type (class), for example, pixels classified as a type (class) vehicle are similarly present around the pixel, and a region formed by the pixels forms an image visually recognizable as a vehicle as a whole. Therefore, a region for each type (class) classified in units of pixels is formed in the image.

Note that an example has been described in which the type determination unit 379 determines the type by executing the 3D semantic segmentation processing in units of pixels on the basis of the depth data, the image feature amount, the point cloud feature amount, and the radar detection result feature amount.

However, the 3D semantic segmentation processing may be implemented by executing 2D semantic segmentation processing using only 2D (two-dimensional) image data and the image feature amount instead of the depth data, determining the type in units of pixels, and then associating the depth data in units of pixels. Furthermore, the 3D semantic segmentation processing may be performed without using the radar detection result feature amount.

<Detection of Parking Space by Context Awareness Unit (Part 1)>

Next, detection of a parking space by the context awareness unit 324 will be described.

As described above, the 3D semantic segmentation information includes the depth data and the type in units of pixels in the captured image data.

Therefore, the context awareness unit 324 specifies the relationship between objects using the type determination result in units of pixels in the image obtained by imaging the surroundings on the basis of the 3D semantic segmentation information by the processing called context awareness processing, and recognizes the surrounding situation from the specified relationship between objects.

In this example, the context awareness unit 324 includes a parking space detection unit 324a, and causes the parking space detection unit 324a to execute the context awareness processing based on the 3D semantic segmentation information to detect a parking space in the image from the relationship between objects.

Figure 9:
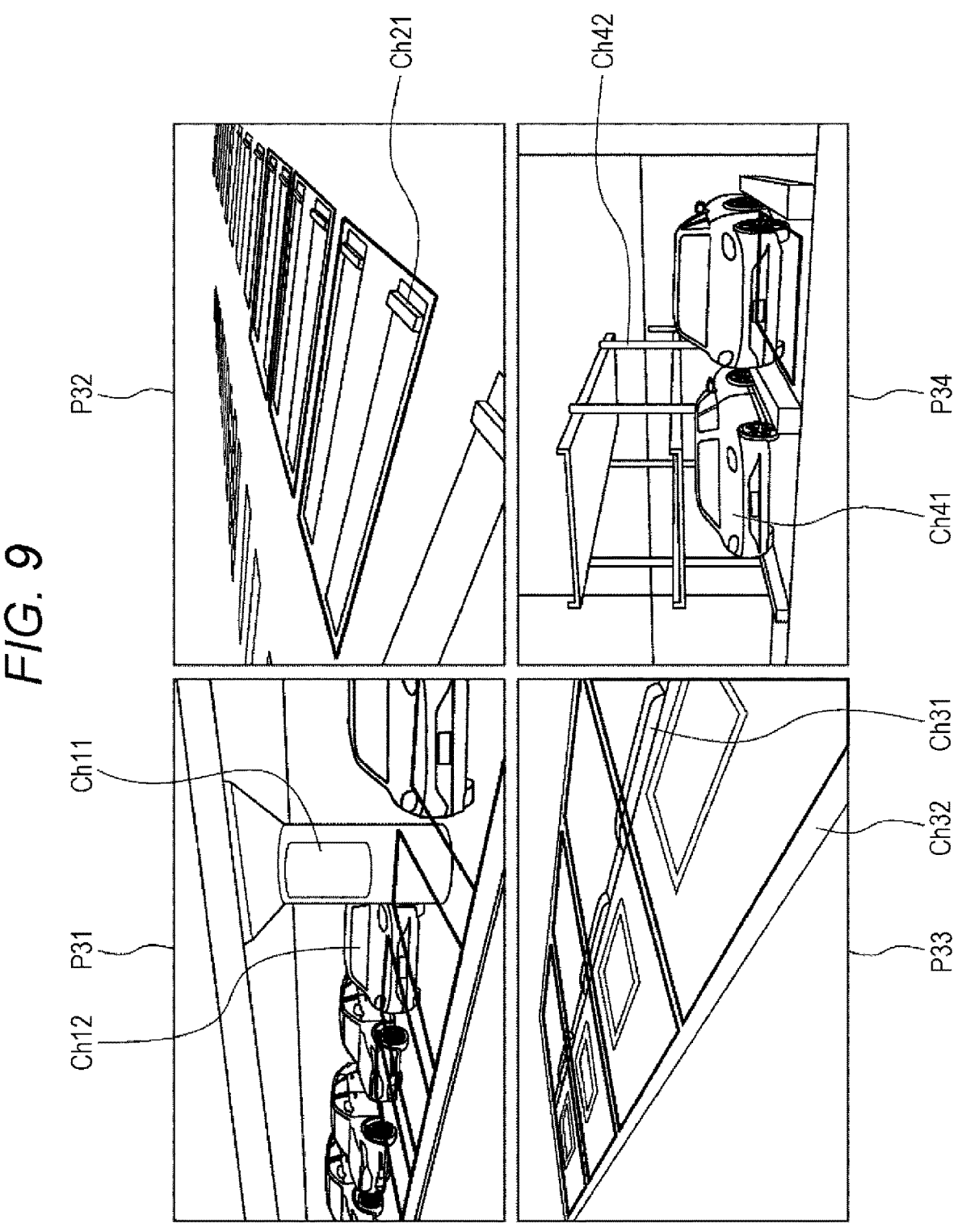
FIG. 9 is a diagram for describing a detection example of a parking space.

For example, in the case of an image P31 in FIG. 9, the parking space detection unit 324a recognizes the range indicated by the solid line as a parking space on the basis of a positional relationship between a columnar support Ch11 and a stopped vehicle Ch12 in the image P31, the size and shape of a space, and the like on the basis of the depth data and the type in units of pixels.

For example, in the case of an image P32 in FIG. 9, the parking space detection unit 324a recognizes the range indicated by the solid line as a parking space on the basis of an arrangement interval of a plurality of wheel stoppers Ch21 in the image P32, the size and shape of a space, and the like on the basis of the depth data and the type in units of pixels.

Moreover, for example, in the case of an image P33 in FIG. 9, the parking space detection unit 324a recognizes the range indicated by the solid line as a parking space on the basis of an arrangement interval between a tiltable wheel stopper Ch31 and a white line Ch32 in a coin parking in the image P33, and the size of a space on the basis of the depth data and the type in units of pixels.

Furthermore, for example, in the case of an image P34 in FIG. 9, the parking space detection unit 324a recognizes the range indicated by the solid line as a parking space on the basis of a positional relationship between a vehicle Ch41 and a columnar support Ch42 for multistory parking in the image P34, the size and shape of a space, and the like on the basis of the depth data and the type in units of pixels.

As described above, (the parking space detection unit 324a of) the context awareness unit 324 functions as a recognizer on which machine learning such as deep neural network (DNN) has been performed, thereby detecting the parking space on the basis of the relationship between the plurality of recognition results based on the depth data and the type (class) information included in the 3D semantic segmentation information.

Note that the recognizer on which the machine learning by DNN that implements (the parking space detection unit 324a of) the context awareness unit 324 has been performed and the recognizer on which the machine learning by DNN that implements the type determination unit 379 has been performed may be different from or the same as each other.

Then, the parking space detection unit 324a of the context awareness unit 324 detects a parking space that is an empty space where a vehicle is not parked in the region detected as the parking space described with reference to FIG. 9 as a target parking space that is a parking target as the parking assistance function.

<Detection of Parking Space by Context Awareness Unit (Part 2)>

Although the method of detecting a parking space in a parking lot has been described above, an example of detecting a parking space on a road instead of a parking lot will be described.

Figure 10:
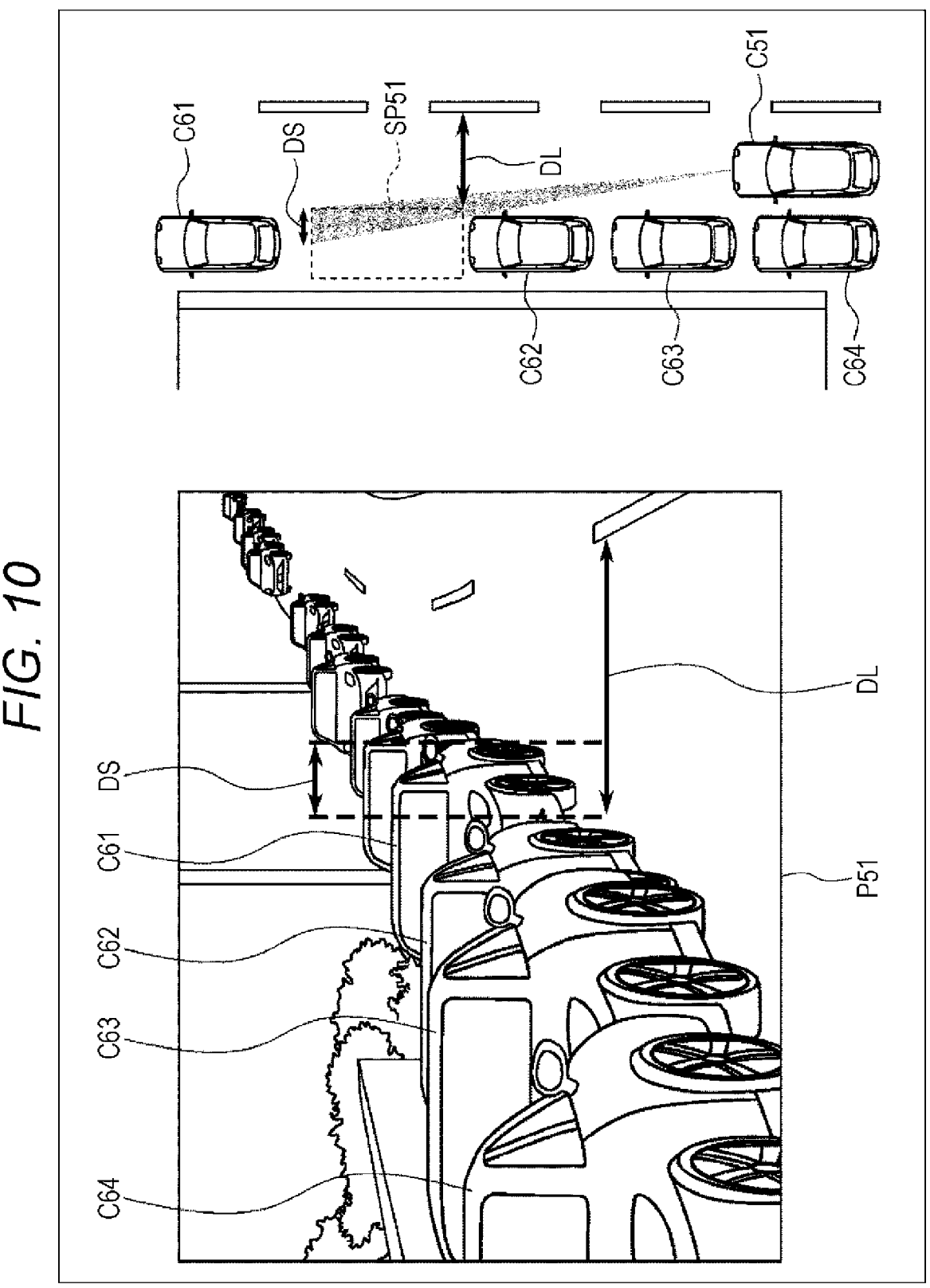
FIG. 10 is a diagram for describing a detection example of a parking space.

For example, consider a case where an image P51 as illustrated in FIG. 10 is captured by the camera 202.

The image P51 is an image obtained when an upper side in the figure is captured as a front side from the vehicle C51 in the bird's-eye view illustrated in the right part of FIG. 10. In the image P51, vehicles C61 to C64 are parallel parked on the left side of a road.

The 3D semantic segmentation information including the depth data and the type (class) is set for each pixel in the image P51. Therefore, as illustrated in the right part of the figure, the parking space detection unit 324a of the context awareness unit 324 can recognize distances of the vehicles C61 and C62 from the right rear vehicle C51 in the image P51 and can recognize the presence of a parking space SP51 from the difference between the distances.

More specifically, for example, the parking space detection unit 324a of the context awareness unit 324 can specify the size of the rectangular empty space indicated by the dotted line in the figure on the basis of a distance DL between a right front end portion of the vehicle C62 and the white line, a distance to the right front end portion of the vehicle C62, a width DS of a right rear end portion of the visible vehicle C61, and a distance to the right rear end portion of the vehicle C61. Specifically, the size of the empty space is specified using both parking space recognition processing using an offline learned feature amount extractor based on the 3D semantic segmentation information and parking space recognition processing using the distance information such as the distance DL and the width DS.

Therefore, when the parking space detection unit 324a of the context awareness unit 324 can recognize that the size is large enough to park the vehicle C51 from the specified size of the empty space, the parking space detection unit 324a recognizes the rectangular empty space indicated by the dotted line in the figure as a parking space SP51.

As described above, the parking space detection unit 324a of the context awareness unit 324 can recognize the empty space between the vehicles C61 and C62 as a parking space on the basis of the image as illustrated as the image P51 in FIG. 10 and the corresponding 3D semantic segmentation information.

As a result, it is difficult to recognize an empty space such as the parking space SP51 about 15 to 30 m ahead only with the two-dimensional image P51, but by setting the 3D semantic segmentation information, the parking space SP51 can be appropriately detected even in a situation where only the right rear edge portion of the vehicle body can be seen.

<3D Semantic Segmentation Image Generation Processing>

Figure 11:
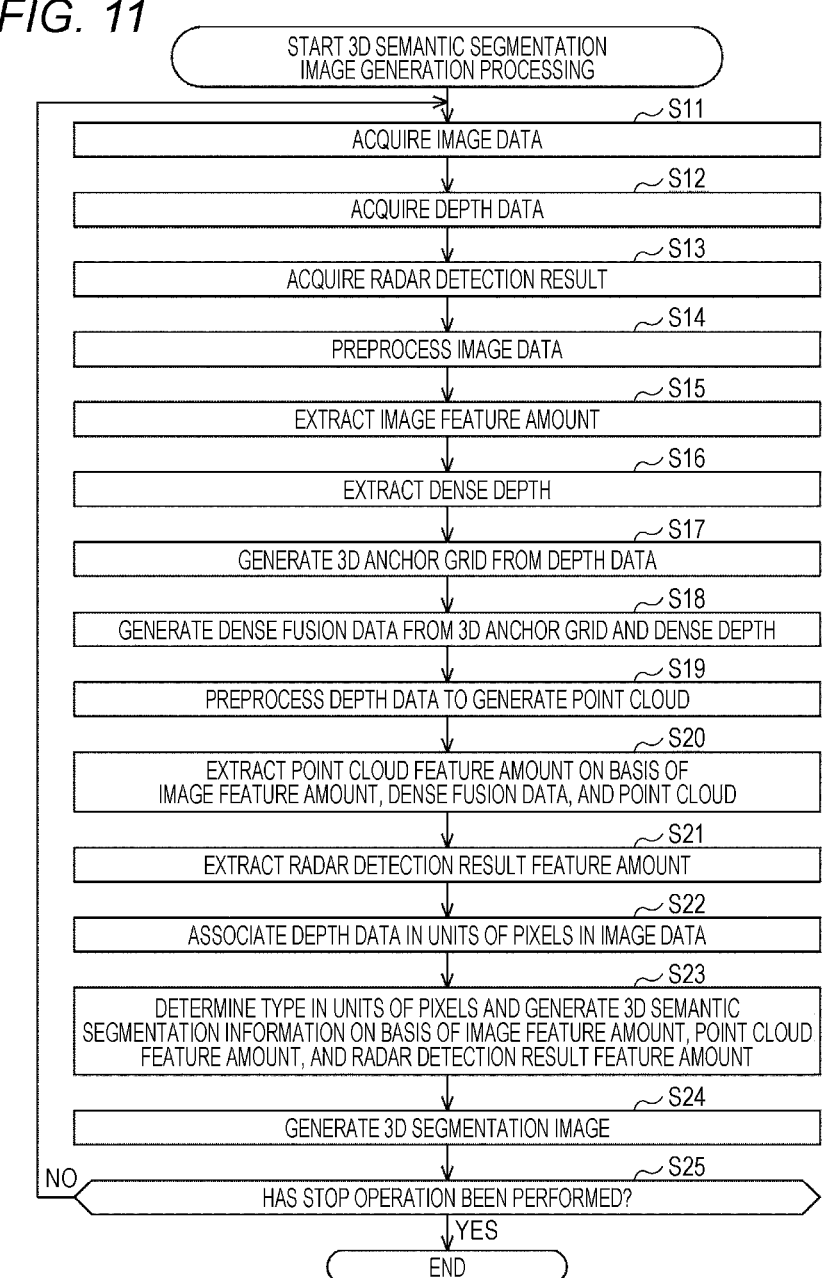
FIG. 11 is a flowchart for describing 3D semantic segmentation information generation processing.

Next, 3D semantic segmentation image generation processing for generating a 3D semantic segmentation image by the 3D semantic segmentation processing unit 323 will be described with reference to a flowchart in FIG. 11.

In step S11, the preprocessing unit 371 acquires the captured image data supplied from the camera 202.

In step S12, the 3D anchor grid generation unit 374 and the preprocessing unit 376 acquire the depth data (distance measurement result) sensed by the ToF camera 203.

In step S13, the radar detection result feature amount extraction unit 378 acquires the detection result of the radar 204 as a radar detection result.

In step S14, the preprocessing unit 371 applies the predetermined preprocessing (contrast correction, edge enhancement, or the like) to the image data supplied from the camera 202, and outputs the image data to the image feature amount extraction unit 372 and the type determination unit 379.

In step S15, the image feature amount extraction unit 372 extracts the feature amount of an image as the image feature amount from the preprocessed image data, and outputs the image feature amount to the monocular depth estimation unit 373, the point cloud feature amount extraction unit 377, and the type determination unit 379.

In step S16, the monocular depth estimation unit 373 estimates the monocular depth (distance measurement image) on the basis of the image feature amount and outputs the monocular depth to the dense fusion processing unit 375 as the dense depth (depth data based on the image).

In step S17, the 3D anchor grid generation unit 374 generates the 3D anchor grid in which three-dimensional anchor positions are formed into a grid on the basis of the depth data (distance measurement result) detected by the ToF camera 203, and outputs the 3D anchor grid to the dense fusion processing unit 375.

In step S18, the dense fusion processing unit 375 generates the dense fusion data by fusing the 3D anchor grid supplied from the 3D anchor grid generation unit 374 and the dense depth supplied from the monocular depth estimation unit 373, and outputs the dense fusion to the point cloud feature amount extraction unit 377.

In step S19, the preprocessing unit 376 applies the preprocessing such as noise removal to the point cloud data including the depth data (distance measurement result) supplied from the ToF camera 203, and outputs the preprocessed point cloud data to the point cloud feature amount extraction unit 377 and the type determination unit 379.

In step S20, the point cloud feature amount extraction unit 377 extracts the point cloud feature amount from the preprocessed point cloud data supplied from the preprocessing unit 376 and outputs the point cloud feature amount to the type determination unit 379 on the basis of the image feature amount supplied from the image feature amount extraction unit 372 and the dense fusion data supplied from the dense fusion processing unit 375.

In step S21, the radar detection result feature amount extraction unit 378 extracts the radar detection result feature amount from the detection result of the radar 204 supplied from the radar 204, and outputs the radar detection result feature amount to the type determination unit 379.

In step S22, the type determination unit 379 associates the depth data in each pixel of the image data supplied from the preprocessing unit 376 on the basis of the point cloud data supplied from the preprocessing unit 371, thereby associating the depth data in units of pixels in the image data.

In step S23, the type determination unit 379 applies the object recognition processing by the 3D semantic segmentation processing on the basis of the depth data in units of pixels, the image feature amount supplied from the image feature amount extraction unit 372, the point cloud feature amount supplied from the point cloud feature amount extraction unit 377, and the radar detection result feature amount supplied from the radar detection result feature amount extraction unit 378, determines the type (class) of the image data in units of pixels, and generates the 3D semantic segmentation information (x, y, z, seg).

In step S24, the type determination unit 379 generates an image in which the 3D semantic segmentation information (x, y, z, seg) is associated in units of pixels with respect to the captured image data as the 3D semantic segmentation image, and stores the images in time series.

In step S25, whether or not a stop operation has been made is determined, and in a case where the stop operation has not been made, the processing returns to step S11. That is, the processing of steps S11 to S25 is repeated until the stop operation is made.

Then, in the case where an instruction on the stop operation is given in step S25, the processing ends.

By the above processing, the 3D semantic segmentation information is set in units of pixels for each piece of image data captured in time series, and further, the processing of generating an image including the 3D semantic segmentation information as the 3D semantic segmentation image is repeated and the images are sequentially stored.

Then, parking assistance processing to be described below is implemented using the 3D semantic segmentation images sequentially generated in time series.

Furthermore, since the 3D semantic segmentation images are sequentially stored in time series by the above processing independently of other processing, processing using the 3D semantic segmentation images generated in time series can be performed in other processing.

For example, the object detection unit 321 may detect an object on the basis of the 3D semantic segmentation image. Furthermore, the object tracking unit 322 may track the object using the 3D semantic segmentation image with respect to the object detection result of the object detection unit 321. Moreover, in the processing in the parking mode to be described below, the 3D semantic segmentation image of surroundings of the parking space can be used for processing of confirming whether or not the parking space becomes unavailable due to an obstacle being found or the like until parking of a vehicle to the parking space is completed.

<Parking Assistance Processing>

Figure 12:
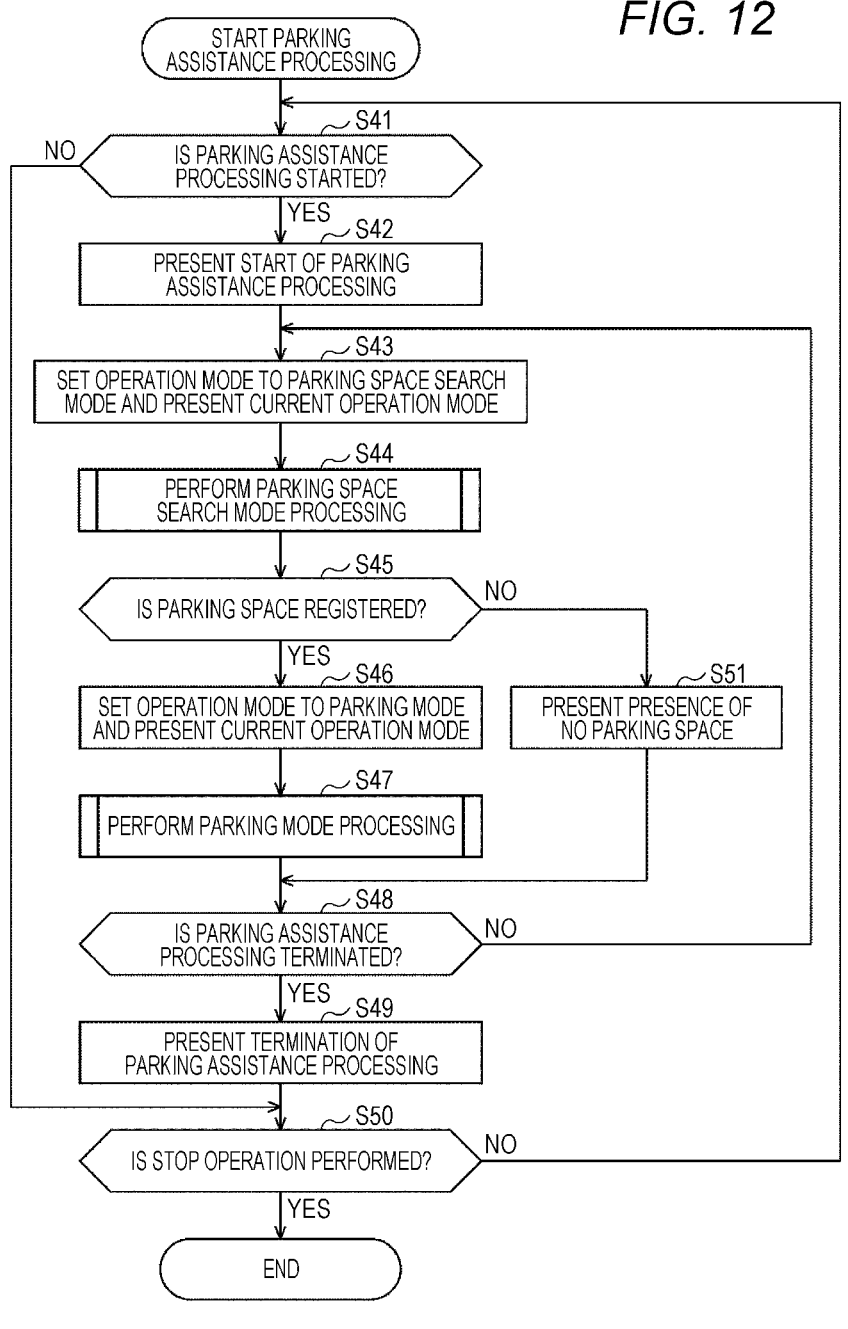
FIG. 12 is a flowchart for describing parking assistance processing.

Next, parking assistance processing will be described with reference to the flowchart of FIG. 12.

In step S41, the parking assistance control unit 201 determines whether or not to start the parking assistance processing. For example, the parking assistance control unit 201 may determine whether or not to start the parking assistance processing on the basis of whether or not an input device such as the HMI 31 giving an instruction on the start of the parking assistance processing has been operated.

Furthermore, the parking assistance control unit 201 may determine whether or not to start the parking assistance processing on the basis of whether or not information indicating an entrance of a parking lot has been detected from the 3D semantic segmentation image.

In step S41, in the case where it is deemed that the instruction on the start of the parking assistance processing has been given, the processing proceeds to step S42.

In step S42, the parking assistance control unit 201 controls the HMI 31 to present information indicating that the parking assistance processing has been started.

In step S43, the parking assistance control unit 201 sets the operation mode to the parking space search mode, and controls the HMI 31 to present that the current operation mode is the parking space search mode.

In step S44, the parking assistance control unit 201 causes the context awareness unit 324 in the recognition unit 273 of the analysis unit 261 to execute the parking space search mode processing, searches for a parking space, and registers the parking space as the search result. Note that the parking space search mode processing will be described below in detail with reference to the flowchart of FIG. 13.

In step S45, the parking assistance control unit 201 determines whether or not an available parking space is registered in the context awareness unit 324. Note that the meaning of "registered" does not mean that a parking space or the like at home is registered in advance, but means that the parking space or the like is temporarily registered in the context awareness unit 324.

In step S45, in the case where it is determined that an available parking space is registered, the processing proceeds to step S46.

In step S46, the parking assistance control unit 201 switches and sets the operation mode to the parking mode, and controls the HMI 31 to present that the operation mode is the parking mode.

In step S47, the parking assistance control unit 201 causes the action planning unit 262 to execute parking mode processing to park the vehicle. Note that details of the parking mode processing will be described below in detail with reference to the flowchart of FIG. 14.

In step S48, the parking assistance control unit 201 determines whether or not the parking assistance processing has been terminated. More specifically, the parking assistance control unit 201 determines whether or not the parking assistance processing has been terminated by presenting that parking has been completed by the parking mode processing or that there is no parking space and parking is difficult to be performed.

In step S48, in the case where it is determined that the parking assistance processing has been terminated, the processing proceeds to step S49.

In step S49, the parking assistance control unit 201 controls the HMI 31 to present that the parking assistance processing has been terminated.

In step S50, the parking assistance control unit 201 determines whether or not the stop operation for stopping the operation of the vehicle 1 has been performed, and in the case where it is determined that the stop operation of the vehicle 1 has not been performed, the processing returns to step S41.

Meanwhile, in step S45, in the case where it is determined that an available parking space is not registered, the processing proceeds to step S51.

In step S51, the parking assistance control unit 201 controls the HMI 31 to present that there is no parking space, and the processing proceeds to step S48.

Furthermore, in step S41, in the case where the instruction on the start of the parking assistance processing has not been given, the processing proceeds to step S50.

That is, in the case where the instruction on the start of the parking assistance processing has not been given and the stop operation of the vehicle 1 has not been performed, the processing of steps S41 and S50 is repeated.

Then, in step S50, in the case where the stop operation of the vehicle 1 has been performed, the processing is terminated.

According to the above processing, in the parking space search mode, the search for the parking space based on the 3D semantic segmentation information is performed, and in the case where the parking space is searched for and registered, the parking operation of the vehicle 1 to the parking space registered as the search result is performed.

Furthermore, in the case where the parking space is not searched for and the available parking space is not registered, it is presented that there is no parking space and parking is difficult to be performed.

According to the above processing, the parking mode processing is performed after the parking space search mode processing is performed, so that the parking operation is performed after finding a parking space in the surroundings as in the case where a human performs the parking operation. Therefore, quick and smooth parking assistance can be implemented.

<Parking Space Search Mode Processing>

Figure 13:
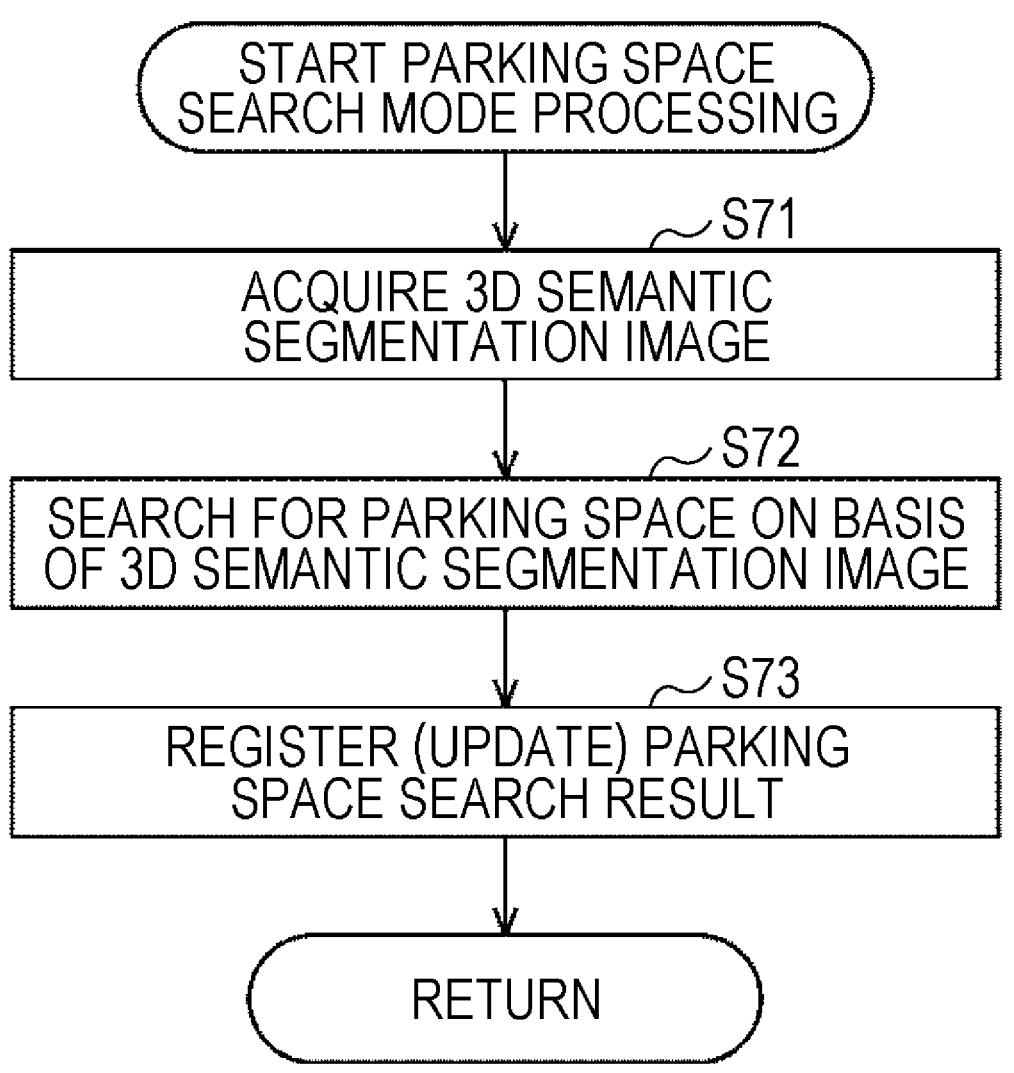
FIG. 13 is a flowchart for describing parking space search mode processing.

Next, parking space search mode processing will be described with reference to the flowchart of FIG. 13.

In step S71, the context awareness unit 324 acquires the 3D semantic segmentation image registered in the 3D semantic segmentation processing unit 323.

In step S72, the context awareness unit 324 causes the parking space detection unit 324a to search for a parking space on the basis of the 3D semantic segmentation image. Here, parking space search processing by the parking space detection unit 324a of the context awareness unit 324 is, for example, the context awareness processing described with reference to FIGS. 9 and 10.

In step S73, the context awareness unit 324 registers (updates) information of the searched parking space and its position as a search result of the parking space based on the 3D semantic segmentation image by the parking space detection unit 324a.

Through the above processing, the parking space is searched for by the context awareness processing based on the 3D semantic segmentation image, and is sequentially registered in the parking space detection unit 324a.

Note that, since similar processing is repeated as long as the parking space search mode is continued, in a case where the available parking space that has been searched for is no longer an available parking space due to, for example, occurrence of an obstacle or parking of another vehicle, the information of the parking space that has been registered is deleted and updated.

Furthermore, similarly, even when a space that has not been searched for as an available parking space is newly searched for as a vehicle drives away from the parking space during the parking space search mode, the space is newly registered.

Moreover, in a case where a plurality of parking spaces is searched for, position information of the plurality of parking spaces is registered.

<Parking Mode Processing>

Next, parking mode processing will be described with reference to the flowchart of FIG. 14.

In step S91, the action planning unit 262 reads the position information of the parking space registered in the parking space detection unit 324a. In the case where the position information of the plurality of parking spaces is registered, the position information of the plurality of parking spaces is read.

In step S92, the action planning unit 262 sets a parking space at the shortest distance from the position of the host vehicle among the read position information of the parking space as the target parking space. At that time, there may be a step of asking the user whether to set the parking space at the shortest distance as the target parking space. Alternatively, a plurality of parking spaces may be displayed on a display disposed in the vehicle interior, and the user may select the target parking space from the plurality of parking spaces.

In step S93, the action planning unit 262 causes the path planning unit 351 to plan a path to the target parking space as a parking path.

In step S94, the action planning unit 262 controls the HMI 31 to present the parking path to the target parking space planned by the path planning unit 351.

In step S95, the action planning unit 262 causes the operation control unit 263 to operate the vehicle 1 along the parking path.

In step S96, the action planning unit 262 determines whether or not parking has been completed. In step S96, in the case where it is determined that parking has not been completed, the processing proceeds to step S97.

In step S97, the action planning unit 262 determines whether or not the target parking space is in an unavailable state, for example, on the basis of the latest 3D semantic segmentation image. That is, whether or not the parking space becomes unavailable due to an obstacle being found in the target parking space while the vehicle is moving along the parking path or another vehicle entering the target parking space while the vehicle is moving to the parking path is determined.

In step S96, in the case where the target parking space is not unavailable, the processing returns to step S94. That is, the processing of steps S94 to S97 is repeated until parking is completed unless the operation is performed along the parking path and the target parking space becomes unavailable.

Furthermore, in step S97, in the case where the target parking space is determined to be unavailable, the processing proceeds to step S98.

In step S98, the action planning unit 262 determines whether or not the position information of other parking spaces exists in the read position information of the parking space.

In step S98, in the case where the position information of other parking spaces is determined to be present in the read position information of the parking space, the processing returns to step S92.

That is, the new parking space is reset as the target parking space and the parking path is reset, and the processing of steps S94 to S97 is repeated.

Then, in step S96, in the case where it is determined that the parking has been completed, the processing proceeds to step S100.

In step S100, the action planning unit 262 controls the HMI 31 to present an image providing notification of the completion of parking.

Furthermore, in step S98, in the case where there are no other parking spaces, the processing proceeds to step S99.

In step S99, the action planning unit 262 controls the HMI 31 to present an image notifying that no parking space is found and parking is not available.

According to the above processing, the parking space of the position information closest to the host vehicle among the position information registered as the parking spaces is set as the target parking space, the parking path is planned, and the operation along the parking path is performed, so that automatic parking is implemented.

At this time, in the case where the parking space becomes unavailable due to detection of the presence of an obstacle in the target parking space or another vehicle being parked in the target parking space while the host vehicle is parked in the target parking space, and when the position information of other parking spaces has been registered, the parking space at the position closest to the host vehicle among the other parking spaces is reset as the target parking space and parking is performed.

Through the above series of processing, the depth data (three-dimensional position) and the type (class) of the object are set in units of pixels in the image on the basis of the image captured by the camera 202, the depth data (distance measurement result) detected by the ToF camera 203, and the detection result of the radar 204, and the 3D semantic segmentation image is generated.

Furthermore, the parking space is detected by the context awareness processing based on the 3D semantic segmentation image, and the position information is registered.

Then, the parking path is set on the basis of the registered position information of the parking space, and the operation for parking is controlled.

As a result, the point cloud feature amount and the radar detection result feature amount, which are three-dimensional information, are combined in addition to the image feature amount, and the type (class) is determined in units of pixels, so that more accurate type determination can be implemented.

Furthermore, since the parking space can be specified by the context awareness processing using the 3D semantic segmentation image in which the type determination has been performed with high accuracy, various parking spaces can be appropriately searched for without being affected by the environment of the parking space. Furthermore, since the parking path can be set after the parking space is set in the image captured by the camera of the vehicle, the parking path can be set without passing through the vicinity of the parking space.

As a result, since it is possible to specify the parking space on the basis of the information in the image captured by the camera and then set the parking path and park, quick and smooth parking assistance can be implemented as in the case where a human performs the parking operation.

<<4. Example of Execution by Software>>

By the way, the above-described series of processing can be executed by hardware or software. In a case where the series of processing is executed by software, a program constituting the software is installed from a recording medium into a computer incorporated in special hardware, a general-purpose computer capable of executing various functions by installing various programs, or the like.

Figure 15:
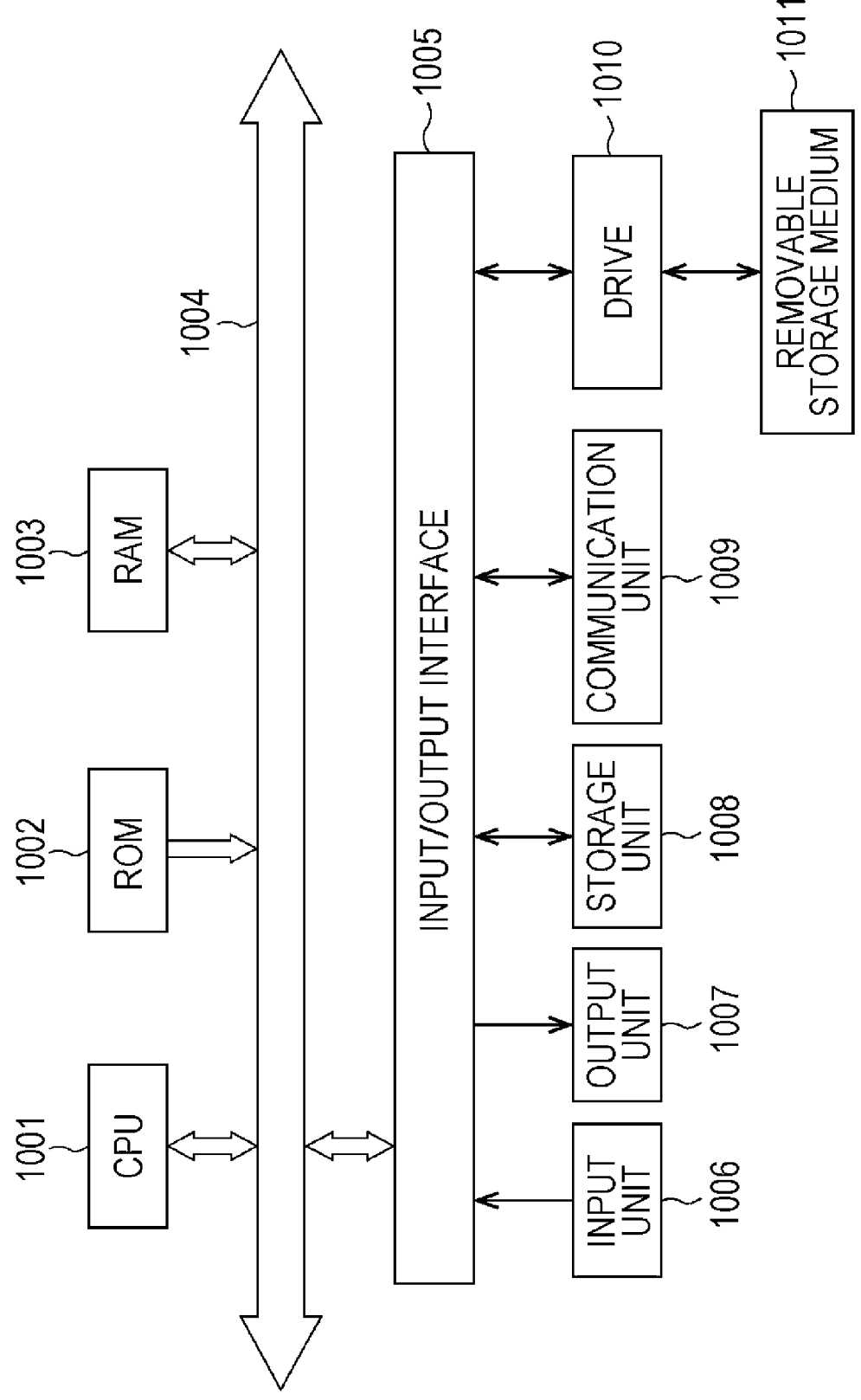
FIG. 15 is a diagram for describing a configuration example of a general-purpose computer.

FIG. 15 illustrates a configuration example of a general-purpose computer. The personal computer incorporates a central processing unit (CPU) 1001. An input/output interface 1005 is connected to the CPU 1001 via a bus 1004. A read only memory (ROM) 1002 and a random access memory (RAM) 1003 are connected to the bus 1004.

To the input/output interface 1005, an input unit 1006 including an input device such as a keyboard and a mouse for a user to input operation commands, an output unit 1007 that outputs a processing operation screen and an image of a processing result to a display device, a storage unit 1008 including a hard disk drive for storing programs and various data, and a communication unit 1009 including a local area network (LAN) adapter and the like and which executes communication processing via a network typified by the Internet are connected. Furthermore, a drive 1010 that reads and writes data with respect to a removable storage medium 1011 such as a magnetic disk (including a flexible disk), an optical disk (including a compact disc-read only memory (CD-ROM) or a digital versatile disc (DVD)), a magneto-optical disk (including a mini disc (MD)), or a semiconductor memory is connected to the input/output interface 1005.

The CPU 1001 executes various types of processing according to a program stored in the ROM 1002 or a program read from the removable storage medium 1011 such as a magnetic disk, an optical disk, a magneto-optical disk, or a semiconductor memory, installed in the storage unit 1008, and loaded from the storage unit 1008 to the RAM 1003. Furthermore, the RAM 1003 appropriately stores data and the like necessary for the CPU 1001 to execute the various types of processing.

In the computer configured as described above, the CPU 1001, for example, loads the program stored in the storage unit 1008 into the RAM 1003 and executes the program via the input/output interface 1005 and the bus 1004, whereby the above-described series of processing is performed.

The program to be executed by the computer (CPU 1001) can be recorded on the removable storage medium 1011 as a package medium or the like, for example, and provided. Furthermore, the program can be provided via a wired or wireless transmission medium such as a local area network, the Internet, or digital satellite broadcast.

In the computer, the program can be installed to the storage unit 1008 via the input/output interface 1005 by attaching the removable storage medium 1011 to the drive 1010. Furthermore, the program can be received by the communication unit 1009 via a wired or wireless transmission medium and installed in the storage unit 1008. Other than the above method, the program can be installed in the ROM 1002 or the storage unit 1008 in advance.

Note that the program executed by the computer may be a program processed in chronological order according to the order described in the present specification or may be a program executed in parallel or at necessary timing such as when a call is made.

Note that the CPU 1001 in FIG. 15 implements the function of the parking assistance control unit 201 in FIG. 6.

Furthermore, in the present specification, the term "system" means a group of a plurality of configuration elements (devices, modules (parts), and the like), and whether or not all the configuration elements are in the same casing is irrelevant. Therefore, a plurality of devices housed in separate housings and connected via a network, and one device that houses a plurality of modules in one housing are both systems.

Note that the embodiments of the present disclosure are not limited to the above described embodiments, and various modifications can be made without departing from the gist of the present disclosure.

For example, the present disclosure can adopt a configuration of cloud computing in which one function is shared and processed in cooperation by a plurality of devices via a network.

Furthermore, the steps described in the above-described flowcharts can be executed by one device or can be shared and executed by a plurality of devices.

Moreover, in a case where a plurality of processes is included in one step, the plurality of processes included in the one step can be executed by one device or can be shared and executed by a plurality of devices.

Note that the present disclosure can have the following configurations.

<1> An information processing device including:

circuitry configured to:

receive image data of surroundings of a vehicle;

receive depth data of the surroundings of the vehicle;

generate, based on the image data and the depth data, a 3D semantic segmentation image having a plurality of pixel units, each pixel unit of the plurality of pixel units including the depth data and class information; and search for an available parking space based on the 3D semantic segmentation image.

<2> The information processing device according to <1>, in which the circuitry is configured to:

generate pixel-based depth data based on the image data and the depth data, and generate the 3D semantic segmentation image by performing 3D semantic segmentation processing for the image data based on the pixel-based depth data, the class information being classified by the 3D semantic segmentation processing.

<3> The information processing device according to <2>, in which:

the circuitry is configured to:

extract a point cloud feature amount based on the depth data, and generate the 3D semantic segmentation image by performing the 3D semantic segmentation processing for the image data based on the point cloud feature amount.

<4> The information processing device according to <3>, in which:

the circuitry is configured to:

extract an image feature amount from the image data, and extract the point cloud feature amount based on the depth data and the image feature amount.

<5> The information processing device according to <4>, in which:

the circuitry is configured to:

generate dense depth data based on the image feature amount, and extract the point cloud feature amount based on the depth data and the dense depth data.

<6> The information processing device according to <5>, in which:

the circuitry is configured to:

generate a 3D anchor grid based on the depth data; and generate dense fusion data by fusing the dense depth data and the 3D anchor grid, and extract the point cloud feature amount based on the image feature amount and the dense fusion data.

<7> The information processing device according to any one of <4> to <6>, in which:

the circuitry is configured to:

receive a radar detection result detected by a radar having a field of view surrounding the vehicle;

extract a radar detection result feature amount from the radar detection result, and generate the 3D semantic segmentation image by performing the 3D semantic segmentation processing for the image data based on the point cloud feature amount, the image feature amount, and the radar detection result feature amount.

<8> The information processing device according to <7>, in which the depth data is generated by an optical ranging sensor, and the circuitry is configured to perform the 3D semantic segmentation processing for the image data based on the radar detection result feature amount under a condition a degree of reliability of the depth data generated by the optical ranging sensor is equal to or less than a predetermined threshold value.

<9> The information processing device according to <7> or <8>, in which the radar detection result includes speed information at which an object in the surroundings of the vehicle moves.

<10> The information processing device according to <1>, in which the circuitry is configured to:

generate 2D semantic segmentation image by performing 2D semantic segmentation processing for the image data, and generate pixel-based depth data based on the image data and the depth data, and generate the 3D semantic segmentation image based on the 2D semantic segmentation image and the pixel-based depth data.

<11> The information processing device according to any one of <2> to <9>, in which the 3D semantic segmentation processing is configured to be performed by machine learning including a deep neural network (DNN).

<12> The information processing device according to any one of <1> to <11>, in which the circuitry is configured to search for the available parking space based on a relationship among a plurality of regions in the 3D semantic segmentation image, each of the plurality of regions including the class information.

<13> The information processing device according to <12>, in which the circuitry is configured to search for the available parking space by performing context awareness processing analyzing the relationship among the plurality of regions.

<14> The information processing device according to <13>, in which the context awareness processing is configured to be performed by machine learning including a deep neural network (DNN).

<15> The information processing device according to any one of <1> to <14>, in which the circuitry is configured to:

register the searched available parking space in a memory;

plan a path to the registered available parking space, and control a parking operation of the vehicle along the planned path.

<16> The information processing device according to <15>, in which, the circuitry is configured to:

set, under a condition a plurality of available parking spaces is registered in the memory, a closest available parking space among the plurality of available parking spaces as a target parking space, plan a path to the target parking space, and control the parking operation of the vehicle along the planned path.

<17> The information processing device according to <16>, in which, the circuitry is configured to:

continuously confirm whether or not the target parking space is available based on the 3D semantic segmentation image during the parking operation of the vehicle;

set, under a condition the target parking space is not available, a second closest available parking space next to the current target parking space among the plurality of available parking spaces registered in the memory as a new target parking space;

plan a path to the new target parking space, and control the parking operation of the vehicle along the planned path.

<18> The information processing device according to <15>, in which, the circuitry is configured to:

set, under a condition a plurality of available parking spaces is registered in the memory, an available parking space selected by a user among the plurality of available parking spaces as a target parking space, plan a path to the target parking space, and control the parking operation of the vehicle along the planned path.

<19> An information processing method including:

generating image data of surroundings of a vehicle;

generating depth data of the surroundings of the vehicle;

generating, based on the image data and the depth data, a 3D semantic segmentation image having a plurality of pixel units, each pixel unit of the plurality of pixel units including the depth data and class information; and searching for an available parking space based on the 3D semantic segmentation image.

<20> A non-transitory computer readable storage medium having computer code stored therein that when executed by a processor cause the processor to perform an information processing method, the information processing method comprising:

generating, based on image data of surroundings of a vehicle and depth data of the surroundings of the vehicle, a 3D semantic segmentation image having a plurality of pixel units, each pixel unit of the plurality of pixel units including the depth data and class information; and searching for an available parking space based on the 3D semantic segmentation image.

<21> A method of determining a parking space comprising:

generating image data, the image data being captured by a camera having a forward field of view of a vehicle;

generating depth data, the depth data being generated based on a depth sensor sensing forward of the vehicle;

generating a pixel-based depth information by associating the depth data with the image data;

performing a 3D semantic segmentation on the image data based on the pixel-based depth information to generate a 3D segmented image having a plurality of regions, each region of the plurality of regions including a class information; and determining an available parking space based on the 3D segmented image.

<22> The method according to <21>, further comprising generating image-based depth data based on the image data, and wherein generating the depth data includes combining a depth sensor-based depth data and the image-based depth data.

<23> The method according to <21>, further comprising generating radar sensor data generated based on a radar;

wherein the pixel-based depth information is generated based on the depth data, the image data and the radar sensor data.

<24> The method according to <21>, wherein determining the available parking space includes analyzing a relationship among a plurality of objects in the 3D segmented image.

<25> The method according to <21>, wherein performing the 3D semantic segmentation includes inputting the pixel-based depth information into a first neural network.

<26> The method according to <21>, wherein determining the available parking space includes inputting the 3D segmented image into a second neural network.

<27> The method according to <21>, wherein the available parking space is in front of the vehicle.

<28> The method according to <27>, wherein the available parking space is at least 15 meters ahead from the vehicle.

<29> The method according to <21>, further comprising displaying the available parking space in a display.

<30> A parking assist system comprising:

a first sensor disposed at a vehicle and configured to sense forward of the vehicle, the first sensor comprising a camera and generating image data, a second sensor disposed at the vehicle and configured to sense forward of the vehicle, the second sensor generating depth data, circuitry configured to receive the image data and the depth data;

generating a pixel-based depth information by associating the depth data with the image data;

performing a 3D semantic segmentation on the image data based on the pixel-based depth information to generate a 3D segmented image having a plurality of regions, each region of the plurality of regions including a class information;

determining an available parking space based on the 3D segmented image.

<31> An information processing apparatus comprising:

circuitry configured to receive image data and depth data, wherein the image data being captured by a camera having a forward field of view of a vehicle and wherein the depth data being generated based on a depth sensor sensing forward of the vehicle;

generating a pixel-based depth information by associating the depth data with the image data;

performing a 3D semantic segmentation on the image data based on the pixel-based depth information to generate a 3D segmented image having a plurality of regions, each region of the plurality of regions including a class information;

determining an available parking space based on the 3D segmented image.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

201 Parking assistance control unit
202, and 202-1 to 202-*q* Camera
203, 203-1, and 203-*r* ToF camera 204, and 204-1 to 204-*s* Radar
261 Analysis unit
262 Action planning unit
271 Self-position estimation unit
272 Sensor fusion unit
273 Recognition unit
301 SLAM processing unit
302 OGM storage unit
321 Object detection unit
322 Object tracking unit
323 3D semantic segmentation processing unit
324 Context awareness unit
324*a* Parking space detection unit
351 Path planning unit
371 Pre-processing unit
372 Image feature amount extraction unit
373 Monocular depth estimation unit
374 3D anchor grid generation unit
375 Dense fusion processing unit
376 Pre-processing unit
377 Point cloud feature amount extraction unit
378 Radar detection result feature amount extraction unit
379 Type determination unit

The invention claimed is:

1. An information processing device comprising:

circuitry configured to:

receive image data of surroundings of a vehicle;

receive depth data of the surroundings of the vehicle;

generate, based on the image data and the depth data, a 3D semantic segmentation image having a plurality of pixel units, each pixel unit of the plurality of pixel units including the depth data and class information; and search for an available parking space based on the 3D semantic segmentation image;

generate pixel-based depth data based on the image data and the depth data;

generate the 3D semantic segmentation image by performing 3D semantic segmentation processing for the image data based on the pixel-based depth data, the class information being classified by the 3D semantic segmentation processing;

receive a radar detection result detected by a radar having a field of view surrounding the vehicle;

extract a radar detection result feature amount from the radar detection result, wherein the depth data is generated by an optical ranging sensor, and the circuitry is configured to perform the 3D semantic segmentation processing for the image data based on the radar detection result feature amount under a condition a degree of reliability of the depth data generated by the optical ranging sensor is equal to or less than a predetermined threshold value.

2. The information processing device according to claim 1, wherein the circuitry is configured to:

extract a point cloud feature amount based on the depth data, and generate the 3D semantic segmentation image by performing the 3D semantic segmentation processing for the image data based on the point cloud feature amount.

3. The information processing device according to claim 2, wherein the circuitry is configured to:

extract an image feature amount from the image data, and extract the point cloud feature amount based on the depth data and the image feature amount.

4. The information processing device according to claim 3, wherein the circuitry is configured to:

generate dense depth data based on the image feature amount, and extract the point cloud feature amount based on the depth data and the dense depth data.

5. The information processing device according to claim 4, wherein the circuitry is configured to:

generate a 3D anchor grid based on the depth data; and generate dense fusion data by fusing the dense depth data and the 3D anchor grid, and extract the point cloud feature amount based on the image feature amount and the dense fusion data.

6. The information processing device according to claim 3, wherein the circuitry is configured to:

generate the 3D semantic segmentation image by performing the 3D semantic segmentation processing for the image data based on the point cloud feature amount, the image feature amount, and the radar detection result feature amount.

7. The information processing device according to claim 6, wherein the radar detection result includes speed information at which an object in the surroundings of the vehicle moves.

8. The information processing device according to claim 1, wherein the circuitry is configured to:

generate 2D semantic segmentation image by performing 2D semantic segmentation processing for the image data, and generate pixel-based depth data based on the image data and the depth data, and generate the 3D semantic segmentation image based on the 2D semantic segmentation image and the pixel-based depth data.

9. The information processing device according to claim 1, wherein the 3D semantic segmentation processing is configured to be performed by machine learning including a deep neural network (DNN).

10. An information processing method comprising:

generating image data of surroundings of a vehicle;

generating depth data of the surroundings of the vehicle;

generating, based on the image data and the depth data, a 3D semantic segmentation image having a plurality of pixel units, each pixel unit of the plurality of pixel units including the depth data and class information; and searching for an available parking space based on the 3D semantic segmentation image;

generating pixel-based depth data based on the image data and the depth data;

generating the 3D semantic segmentation image by performing 3D semantic segmentation processing for the image data based on the pixel-based depth data, the class information being classified by the 3D semantic segmentation processing;

receiving a radar detection result detected by a radar having a field of view surrounding the vehicle;

extracting a radar detection result feature amount from the radar detection result, wherein generating the depth data is by an optical ranging sensor, and the circuitry is configured to perform the 3D semantic segmentation processing for the image data based on the radar detection result feature amount under a condition a degree of reliability of the depth data generated by the optical ranging sensor is equal to or less than a predetermined threshold value.

11. A non-transitory computer readable storage medium having computer code stored therein that when executed by a processor cause the processor to perform an information processing method, the information processing method comprising:

generating, based on image data of surroundings of a vehicle and depth data of the surroundings of the vehicle, a 3D semantic segmentation image having a plurality of pixel units, each pixel unit of the plurality of pixel units including the depth data and class information; and searching for an available parking space based on the 3D semantic segmentation image;

generating pixel-based depth data based on the image data and the depth data;

generating the 3D semantic segmentation image by performing 3D semantic segmentation processing for the image data based on the pixel-based depth data, the class information being classified by the 3D semantic segmentation processing;

receiving a radar detection result detected by a radar having a field of view surrounding the vehicle;

extracting a radar detection result feature amount from the radar detection result, wherein generating the depth data is by an optical ranging sensor, and the circuitry is configured to perform the 3D semantic segmentation processing for the image data based on the radar detection result feature amount under a condition a degree of reliability of the depth data generated by the optical ranging sensor is equal to or less than a predetermined threshold value.

12. The information processing device according to claim 1, wherein the circuitry is configured to search for the available parking space based on a relationship among a plurality of regions in the 3D semantic segmentation image, each of the plurality of regions including the class information.

13. The information processing device according to claim 12, wherein the circuitry is configured to search for the available parking space by performing context awareness processing analyzing the relationship among the plurality of regions.

14. The information processing device according to claim 13, wherein the context awareness processing is configured to be performed by machine learning including a deep neural network (DNN).

15. The information processing device according to claim 1, wherein the circuitry is configured to:

register the searched available parking space in a memory;

plan a path to the registered available parking space, and control a parking operation of the vehicle along the planned path.

16. The information processing device according to claim 15, wherein, the circuitry is configured to:

set, under a condition a plurality of available parking spaces is registered in the memory, a closest available parking space among the plurality of available parking spaces as a target parking space, plan a path to the target parking space, and control the parking operation of the vehicle along the planned path.

17. The information processing device according to claim 16, wherein, the circuitry is configured to:

continuously confirm whether or not the target parking space is available based on the 3D semantic segmentation image during the parking operation of the vehicle;

set, under a condition the target parking space is not available, a second closest available parking space next to the current target parking space among the plurality of available parking spaces registered in the memory as a new target parking space;

plan a path to the new target parking space, and control the parking operation of the vehicle along the planned path.

18. The information processing device according to claim 15, wherein, the circuitry is configured to:

set, under a condition a plurality of available parking spaces is registered in the memory, an available parking space selected by a user among the plurality of available parking spaces as a target parking space, plan a path to the target parking space, and control the parking operation of the vehicle along the planned path.

\*    \*    \*    \*    \*